United States Patent
Ryu

(10) Patent No.: US 10,563,003 B2
(45) Date of Patent: Feb. 18, 2020

(54) POLYMERIZABLE COMPOSITION FOR OPTICAL MATERIAL, OPTICAL MATERIAL OBTAINED FROM COMPOSITION, METHOD OF PRODUCING SAME

(71) Applicant: MITSUI CHEMICALS, INC., Minato-ku, Tokyo (JP)

(72) Inventor: Akinori Ryu, Arao (JP)

(73) Assignee: MITSUI CHEMICALS, INC., Minato-ku, Tokyo (JP)

( * ) Notice: Subject to any disclaimer, the term of this patent is extended or adjusted under 35 U.S.C. 154(b) by 0 days.

(21) Appl. No.: 16/094,089

(22) PCT Filed: Oct. 24, 2017

(86) PCT No.: PCT/JP2017/038276
§ 371 (c)(1),
(2) Date: Oct. 16, 2018

(87) PCT Pub. No.: WO2018/079518
PCT Pub. Date: May 3, 2018

(65) Prior Publication Data
US 2019/0127508 A1 May 2, 2019

(30) Foreign Application Priority Data

Oct. 25, 2016 (JP) .................................. 2016-208962

(51) Int. Cl.
| | | |
|---|---|---|
| *C08G 18/12* | (2006.01) |
| *C08G 18/10* | (2006.01) |
| *C08G 18/62* | (2006.01) |
| *C08G 18/38* | (2006.01) |
| *C08G 18/32* | (2006.01) |
| *C08G 18/75* | (2006.01) |
| *G02B 1/04* | (2006.01) |
| *B29D 11/00* | (2006.01) |

(52) U.S. Cl.
CPC ........ *C08G 18/12* (2013.01); *B29D 11/00644* (2013.01); *C08G 18/10* (2013.01); *C08G 18/3206* (2013.01); *C08G 18/3212* (2013.01); *C08G 18/3876* (2013.01); *C08G 18/6283* (2013.01); *C08G 18/758* (2013.01); *G02B 1/041* (2013.01); *C08G 2120/00* (2013.01)

(58) Field of Classification Search
CPC .. G02B 1/041; G02B 1/04; G02B 5/30; C08L 75/04; C08L 81/00; B29D 11/00644; C08G 18/10; C08G 18/12; C08G 18/242; C08G 18/246; C08G 18/3206; C08G 18/3212; C08G 18/3876; C08G 18/5024; C08G 18/6283; C08G 18/722; C08G 18/757; C08G 18/758; C08G 18/7642; C08G 2120/00; G02C 7/12

See application file for complete search history.

(56) References Cited

U.S. PATENT DOCUMENTS

| | | |
|---|---|---|
| 4,689,387 A | 8/1987 | Kajimoto et al. |
| 5,962,617 A | 10/1999 | Slagel |
| 6,127,505 A | 10/2000 | Slagel |
| 7,009,032 B2 | 3/2006 | Bojkova et al. |
| 7,087,698 B1 | 8/2006 | Okoroafor et al. |
| 7,098,290 B1 | 8/2006 | Okoroafor et al. |
| 7,411,034 B2 | 8/2008 | Bojkova et al. |
| 7,491,790 B2 | 2/2009 | Bojkova et al. |

(Continued)

FOREIGN PATENT DOCUMENTS

| | | |
|---|---|---|
| JP | 60199016 A | 10/1985 |
| JP | 08208794 A | 8/1996 |
| JP | 2009524725 A | 7/2009 |
| JP | 2011508822 A | 3/2011 |

(Continued)

OTHER PUBLICATIONS

International Search Report (PCT/ISA/210) dated Jan. 30, 2018, by the Japanese Patent Office as the International Searching Authority for International Application No. PCT/JP2017/038276.
Written Opinion (PCT/ISA/237) dated Jan. 30, 2018, by the Japanese Patent Office as the International Searching Authority for International Application No. PCT/JP2017/038276.

*Primary Examiner* — Michael B Nelson
(74) *Attorney, Agent, or Firm* — Buchanan, Ingersoll & Rooney PC

(57) ABSTRACT

According to the present invention, provided is a polymerizable composition for an optical material including: at least one amine compound (A) selected from a compound (a1) represented by Formula (1) and a compound (a2) represented by Formula (2); an iso(thio)cyanate compound (B) which contains two or more iso(thio) cyanate groups; and a polythiol compound (C) which contains a dithiol compound (c1) containing two mercapto groups and a polythiol compound (c2) containing three or more mercapto groups.

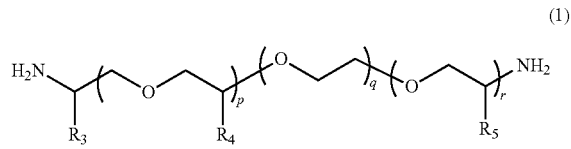

(1)

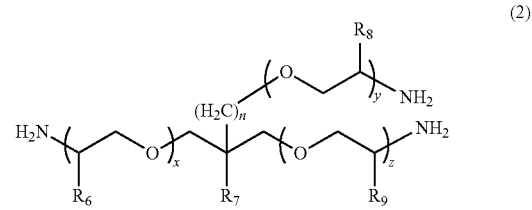

(2)

12 Claims, No Drawings

(56) References Cited

U.S. PATENT DOCUMENTS

| | | |
|---|---|---|
| 8,017,720 B2 | 9/2011 | Bojkova et al. |
| 8,178,615 B2 | 5/2012 | Lu et al. |
| 8,178,644 B2 | 5/2012 | Derderian et al. |
| 8,207,286 B2 | 6/2012 | Rukavina et al. |
| 8,349,986 B2 | 1/2013 | Rukavina et al. |
| 8,399,094 B2 | 3/2013 | Rukavina et al. |
| 8,399,559 B2 | 3/2013 | Rukavina et al. |
| 8,604,153 B2 | 12/2013 | Rukavina et al. |
| 8,653,220 B2 | 2/2014 | Rukavina et al. |
| 8,734,951 B2 | 5/2014 | Rukavina et al. |
| 8,835,592 B2 | 9/2014 | Rukavina et al. |
| 8,859,680 B2 | 10/2014 | Rukavina et al. |
| 8,865,853 B2 | 10/2014 | Rukaivina |
| 8,889,815 B2 | 11/2014 | Rukavina et al. |
| 8,927,675 B2 | 1/2015 | Rukavina et al. |
| 8,933,166 B2 | 1/2015 | Rukavina et al. |
| 9,045,606 B2 | 6/2015 | Lu et al. |
| 9,296,920 B2 | 3/2016 | Rukavina et al. |
| 9,464,169 B2 | 10/2016 | Rukavina |
| 9,527,948 B2 | 12/2016 | Renzi et al. |
| 9,568,643 B2 | 2/2017 | Bojkova et al. |
| 9,598,527 B2 | 3/2017 | Rukavina et al. |
| 9,657,134 B2 | 5/2017 | Rukavina et al. |
| 9,701,807 B2 | 7/2017 | Lu et al. |
| 9,822,211 B2 | 11/2017 | Rukavina et al. |
| 9,891,349 B2 | 2/2018 | Bojkova et al. |
| 9,951,173 B2 | 4/2018 | Rukavina et al. |
| 9,994,670 B2 | 6/2018 | Rukavina |
| 10,012,773 B2 | 7/2018 | Bojkova et al. |
| 2003/0149217 A1 | 8/2003 | Bojkova et al. |
| 2003/0158369 A1 | 8/2003 | Slagel |
| 2004/0138401 A1 | 7/2004 | Bojkova et al. |
| 2004/0143090 A1 | 7/2004 | Bojkova et al. |
| 2005/0282991 A1 | 12/2005 | Bojkova et al. |
| 2006/0025563 A1 | 2/2006 | Bojkova et al. |
| 2006/0047058 A1 | 3/2006 | Lu et al. |
| 2006/0241273 A1 | 10/2006 | Bojkova et al. |
| 2007/0142602 A1 | 6/2007 | Rukavina |
| 2007/0142603 A1 | 6/2007 | Rukavina |
| 2007/0142604 A1 | 6/2007 | Bojkova et al. |
| 2007/0142605 A1 | 6/2007 | Bojkova et al. |
| 2007/0142606 A1 | 6/2007 | Bojkova et al. |
| 2007/0148471 A1 | 6/2007 | Rukavina et al. |
| 2007/0149747 A1 | 6/2007 | Rukavina et al. |
| 2007/0149748 A1 | 6/2007 | Rukavina et al. |
| 2007/0149749 A1 | 6/2007 | Rukavina et al. |
| 2007/0155895 A1 | 7/2007 | Rukavina et al. |
| 2007/0155935 A1 | 7/2007 | Rukavina et al. |
| 2007/0155936 A1 | 7/2007 | Rukavina et al. |
| 2007/0155942 A1 | 7/2007 | Rukavina et al. |
| 2007/0167600 A1 | 7/2007 | Rukavina et al. |
| 2007/0167601 A1 | 7/2007 | Rukavina et al. |
| 2007/0173582 A1 | 7/2007 | Rukavina et al. |
| 2007/0173601 A1 | 7/2007 | Rukavina et al. |
| 2007/0173627 A1 | 7/2007 | Rukavina et al. |
| 2007/0225468 A1 | 9/2007 | Rukavina et al. |
| 2007/0238848 A1 | 10/2007 | Bojkova et al. |
| 2007/0248827 A1 | 10/2007 | Rukavina et al. |
| 2007/0251421 A1 | 11/2007 | Rukavina et al. |
| 2007/0256597 A1 | 11/2007 | Rukavina et al. |
| 2008/0118738 A1 | 5/2008 | Boyer et al. |
| 2008/0161528 A1 | 7/2008 | Bojkova et al. |
| 2008/0286593 A1 | 11/2008 | Boyer et al. |
| 2009/0171059 A1 | 7/2009 | Gerkin et al. |
| 2009/0171060 A1 | 7/2009 | Gerkin et al. |
| 2009/0176945 A1 | 7/2009 | Bojkova et al. |
| 2009/0280329 A1 | 11/2009 | Rukavina et al. |
| 2009/0280709 A1 | 11/2009 | Rukavina et al. |
| 2009/0281268 A1 | 11/2009 | Rukavina et al. |
| 2009/0311504 A1 | 12/2009 | Boyer et al. |
| 2010/0048852 A1 | 2/2010 | Bojkova et al. |
| 2010/0124649 A1 | 5/2010 | Rukavina et al. |
| 2011/0313084 A1* | 12/2011 | Furar .................. C08G 18/3206 524/101 |
| 2012/0231279 A1 | 9/2012 | Lu et al. |
| 2013/0095311 A1 | 4/2013 | Rukavina et al. |
| 2013/0095714 A1 | 4/2013 | Rukavina |
| 2013/0149931 A1 | 6/2013 | Rukavina et al. |
| 2013/0160920 A1 | 6/2013 | Rukavina et al. |
| 2014/0023866 A1 | 1/2014 | Rukavina et al. |
| 2014/0171612 A1 | 6/2014 | Bojkova et al. |
| 2014/0199524 A1 | 7/2014 | Rukavina |
| 2014/0327869 A1 | 11/2014 | Renzi et al. |
| 2014/0364026 A1 | 12/2014 | Rukavina et al. |
| 2015/0252169 A1 | 9/2015 | Lu et al. |
| 2015/0342276 A1* | 12/2015 | Yamasaki ............. C07C 263/20 2/67 |
| 2016/0024340 A1 | 1/2016 | Rukavina |
| 2016/0039967 A1 | 2/2016 | Rukavina |
| 2016/0039968 A1 | 2/2016 | Rukavina |
| 2016/0083556 A1 | 3/2016 | Lu et al. |
| 2016/0215087 A1 | 7/2016 | Rukavina et al. |
| 2016/0333133 A1 | 11/2016 | Rukavina |
| 2017/0129989 A1 | 5/2017 | Kawato |
| 2017/0153359 A1 | 6/2017 | Bojkova et al. |
| 2017/0204217 A1 | 7/2017 | Kawato |
| 2017/0235022 A1 | 8/2017 | Bojkova et al. |
| 2018/0051123 A1 | 2/2018 | Rukavina et al. |

FOREIGN PATENT DOCUMENTS

| | | |
|---|---|---|
| JP | 2017502119 A | 1/2014 |
| JP | 2015003945 A | 1/2015 |
| JP | 2015504099 A | 2/2015 |
| JP | 2016507626 A | 3/2016 |
| JP | 2017214488 A | 12/2017 |
| WO | 9623827 A1 | 8/1996 |
| WO | 0136507 A1 | 5/2001 |
| WO | 0136508 A1 | 5/2001 |
| WO | 2007097798 A1 | 8/2007 |
| WO | WO 2007/078549 * | 12/2007 |
| WO | 2009088456 A2 | 7/2009 |
| WO | 2014126552 A1 | 8/2014 |
| WO | 2015088502 A1 | 6/2015 |
| WO | 2016006605 A1 | 1/2016 |
| WO | 2016006606 A1 | 1/2016 |

* cited by examiner

POLYMERIZABLE COMPOSITION FOR OPTICAL MATERIAL, OPTICAL MATERIAL OBTAINED FROM COMPOSITION, METHOD OF PRODUCING SAME

TECHNICAL FIELD

The present invention relates to a polymerizable composition for an optical material, an optical material obtained from the composition, and a method of producing the same. More specifically, the present invention relates to a polymerizable composition for an optical material from which a thiourethane urea resin molded body is obtained and a method of producing the same.

BACKGROUND ART

Since plastic lenses are lightweight and unlikely to be cracked compared to inorganic lenses and can be dyed, in recent years, plastic lenses have been rapidly spreading as optical materials such as spectacle lenses or camera lenses.

Glass has been mainly used as a material of an optical material. However, in recent years, various kinds of plastics for an optical material have been developed and broadly used as a substitute for glass. From the viewpoints of having excellent optical characteristics, being lightweight, being unlikely to be cracked, and having excellent moldability, plastic materials such as an acrylic resin, an aliphatic carbonate resin, polycarbonate, and polythiourethane have been mainly used as the materials of spectacle lenses. Among these, a polythiourethane resin obtained from a polymerizable composition containing an isocyanate compound and a thiol compound is exemplified as a representative example of the material with a high refractive index (Patent Document 1).

In recent years, due to a change in life style, people who enjoy moving their bodies by playing sports or the like while wearing glasses have been increasing. Further, due to an increase in safety consciousness, there has been an increasing demand for children's glasses which are unlikely to be cracked. Under these circumstances, there has been a strong demand for a base material which is lightweight and has excellent impact resistance. In response to these strong demands, a urethane urea resin has been developed for spectacle lens applications as a base material with excellent impact resistance (Patent Documents 2 to 7). In addition, a thiourethane urea resin (Patent Documents 8 to 12) containing an amine compound, an isocyanate compound, and a thiol compound is suggested as a lens material which achieves both of excellent impact resistance and a high refractive index, and a polyurethane resin (Patent Documents 13 and 14) containing an amine compound, an isocyanate compound, and a polyol compound is suggested as a lens material which has excellent impact resistance and chemical resistance.

RELATED DOCUMENT

Patent Document

[Patent Document 1] Japanese Laid-open Patent Publication No. S60-199016
[Patent Document 2] WO1996/023827A
[Patent Document 3] WO2001/036507A
[Patent Document 4] WO2001/036508A
[Patent Document 5] WO2007/097798A
[Patent Document 6] WO2009/088456A
[Patent Document 7] WO2015/088502A
[Patent Document 8] Japanese Laid-open Patent Publication No. 2015-003945
[Patent Document 9] WO2016/006605A
[Patent Document 10] WO2016/006606A
[Patent Document 11] Japanese Translation of PCT International Application Publication No. 2009-524725
[Patent Document 12] Japanese Translation of PCT International Application Publication No. 2017-502119
[Patent Document 13] Japanese Translation of PCT International Application Publication No. 2011-508822
[Patent Document 14] Japanese Translation of PCT International Application Publication No. 2016-507626

SUMMARY OF THE INVENTION

Technical Problem

A plastic lens with a high refractive index can be obtained from a thiourethane resin. However, the specific gravity thereof tends to be increased as the refractive index thereof is increased, and thus an effect of reducing the weight becomes smaller as the refractive index of the resin is increased.

Further, a urethane urea resin is a lightweight material since the urethane urea resin has a specific gravity smaller than that of the thiourethane resin, and thus a plastic lens with excellent impact resistance can be obtained from the urethane urea resin. However, there is a case where the solvent resistance and the heat resistance of a urethane urea resin molded body are low. Further, the light fastness thereof is also low and the urethane urea molded body is colored yellow when used in a long time in some cases. In addition, since the time (hereinafter, referred to as pot life) taken from preparation of a composition to injection of the composition into a casting mold is short, polymerization spots occur during the injection into the casting mold or polymerization is rapidly promoted in some cases. As the result, cloudiness or striae occurs in a lens to be obtained in some cases.

Solution to Problem

As the result of intensive research conducted by the present inventors in order to solve the above-described problems, it was found that the above-described problems can be solved by allowing a polymerizable composition to contain a specific amine compound, an isocyanate compound, and a polythiol compound and using two compounds, which are a dithiol compound containing two mercapto groups and a polythiol compound containing three or more mercapto groups, in combination as the polythiol compound, thereby completing the present invention.

In other words, the present invention can be described as follows.

[1] A polymerizable composition for an optical material including: at least one amine compound (A) selected from a compound (a1) represented by Formula (1) and a compound (a2) represented by Formula (2); an iso(thio)cyanate compound (B) which contains two or more iso(thio)cyanate groups; and a polythiol compound (C) which contains a dithiol compound (c1) containing two mercapto groups and a polythiol compound (c2) containing three or more mercapto groups:

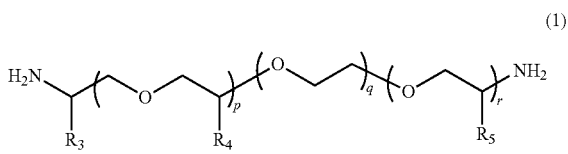

wherein in Formula (1), $R_3$ to $R_5$ each independently represent a hydrogen atom or a methyl group, p represents an integer of 0 to 100, q represents an integer of 0 to 100, r represents an integer of 1 to 100, p+r represents an integer of 1 to 100, and in a case where a plurality of $R_4$'s or $R_5$'s are present, $R_4$'s or $R_5$'s may be the same as or different from each other;

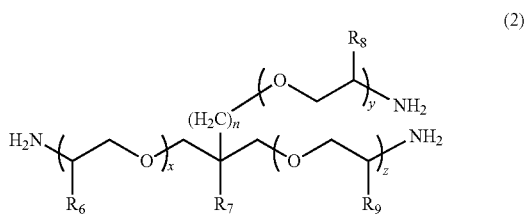

wherein in Formula (2), $R_6$, $R_8$, and $R_9$ each independently represent a hydrogen atom or a methyl group, $R_7$ represents a linear alkyl group having 1 to 20 carbon atoms, a branched alkyl group having 3 to 20 carbon atoms, or a cyclic alkyl group having 3 to 20 carbon atoms, x+y+z represents an integer of 1 to 200, n represents an integer of 0 to 10, and in a case where a plurality of $R_6$'s, $R_8$'s, or $R_9$'s are present, $R_6$'s, $R_8$'s, or $R_9$'s may be the same as or different from each other.

[2] The polymerizable composition for an optical material according to [1], further including a polyol compound (D) which contains two or more hydroxy groups.

[3] The polymerizable composition for an optical material according to [1] or [2], in which a ratio (c1/c2) of a molar number c1 of a mercapto group in a polythiol compound (c1) to a molar number c2 of a mercapto group in a polythiol compound (c2) is in a range of 1 to 13.

[4] The polymerizable composition for an optical material according to any one of [1] to [3], in which a ratio (a/b) of a molar number a of an amino group in an amine compound (A) to a molar number b of an iso(thio)cyanate group in an iso(thio)cyanate compound (B) is in a range of 0.01 to 0.20.

[5] The polymerizable composition for an optical material according to any one of [1] to [4], in which a weight-average molecular weight (MW) of the compound (a1) represented by Formula (1) is in a range of 200 to 4000.

[6] The polymerizable composition for an optical material according to any one of [1] to [5], in which a weight-average molecular weight (MW) of the compound (a2) represented by Formula (2) is in a range of 400 to 5000.

[7] The polymerizable composition for an optical material according to any one of [1] to [6], in which the dithiol compound (c1) is at least one selected from the group consisting of 2,5-dimercaptomethyl-1,4-dithiane, ethylene glycol bis(3-mercaptopropionate), 4,6-bis(mercaptomethylthio)-1,3-dithiane, 2-(2,2-bis(mercaptomethylthio)ethyl)-1,3-dithietane, and bis(2-mercaptoethyl)sulfide, and the polythiol compound (c2) is at least one selected from the group consisting of trimethylolpropane tris(3-mercaptopropionate), pentaerythritol tetrakis(2-mercaptoacetate), pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 1,1,3,3-tetrakis(mercaptomethylthio)propane.

[8] The polymerizable composition for an optical material according to any one of [1] to [7], in which the iso(thio)cyanate compound (B) is at least one selected from the group consisting of hexamethylene diisocyanate, pentamethylene diisocyanate, m-xylylene diisocyanate, isophorone diisocyanate, bis(isocyanatomethyl)cyclohexane, dicyclohexylmethane-4,4'-diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and 4,4'-diphenylmethane diisocyanate.

[9] The polymerizable composition for an optical material according to any one of [1] to [8], in which the polyol compound (D) contains a diol compound (d1) containing two hydroxy groups.

[10] The polymerizable composition for an optical material according to [9], in which the diol compound (d1) contains at least one selected from a linear aliphatic diol compound, a branched aliphatic diol compound, a cyclic aliphatic diol compound, and an aromatic diol compound.

[11] The polymerizable composition for an optical material according to [9] or [10], in which the diol compound (d1) is at least one selected from the group consisting of cyclohexane dimethanol, tricyclodecane dimethanol, and polypropylene glycol.

[12] A molded body which is obtained by curing the polymerizable composition for an optical material according to any one of [1] to [11].

[13] An optical material which is formed of the molded body according to [12].

[14] A plastic lens which is formed of the molded body according to [12].

[15] A plastic polarized lens including: a polarizing film; and a base material layer which is formed on at least one surface of the polarizing film and is formed of the molded body according to [12].

[16] A method of producing a polymerizable composition for an optical material, including: a step (i) of reacting at least one amine compound (A) selected from an amine compound (a1) represented by Formula (1) and an amine compound (a2) represented by Formula (2) with an isocyanate compound (B) which contains two or more iso(thio)cyanate groups to obtain a prepolymer; and a step (ii) of adding a polythiol compound (C) which contains a dithiol compound (c1) containing two mercapto groups and a polythiol compound (c2) containing three or more mercapto groups to the prepolymer so as to be mixed thereinto:

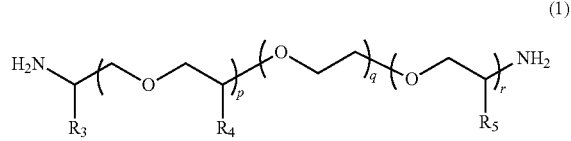

wherein in Formula (1), $R_3$ to $R_5$ each independently represent a hydrogen atom or a methyl group, p represents an integer of 0 to 100, q represents an integer of 0 to 100, r represents an integer of 1 to 100, p+r represents an integer of 1 to 100, and in a case where a plurality of $R_4$'s or $R_5$'s are present, $R_4$'s or $R_5$'s may be the same as or different from each other;

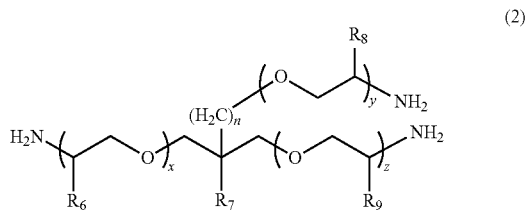

(2)

wherein in Formula (2), $R_6$, $R_8$, and $R_9$ each independently represent a hydrogen atom or a methyl group, $R_7$ represents a linear, branched, or cyclic alkyl group having 1 to 20 carbon atoms, x+y+z represents an integer of 1 to 100, n represents an integer of 0 to 10, and in a case where a plurality of $R_6$'s, $R_8$'s, or $R_9$'s are present, $R_6$'s, $R_8$'s, or $R_9$'s may be the same as or different from each other.

[17] The method of producing a polymerizable composition for an optical material according to [16], in which the step (ii) further includes a step of adding a polyol compound (D) which contains two or more hydroxy groups to the prepolymer obtained in the step (i) so as to be mixed thereinto.

[18] A method of producing an optical material, including: a step of injecting the polymerizable composition for an optical material according to any one of [1] to [11] into a mold; and a step of polymerizing and curing the polymerizable composition for an optical material in the mold.

[19] A method of producing a plastic polarized lens, including: a step of fixing a polarizing film into a mold for casting a lens in a state in which at least one surface of the polarizing film is separated from the mold; a step of injecting the polymerizable composition for an optical material according to any one of [1] to [11] into a gap between the polarizing film and the mold; and a step of polymerizing and curing the polymerizable composition for an optical material and laminating a base material layer formed of the cured product of the polymerizable composition for an optical material on at least one surface of the polarizing film.

Advantageous Effects of Invention

According to the polymerizable composition for an optical material of the present invention, it is possible to obtain a thiourethane urea resin molded body which has a low specific gravity and excellent transparency, heat resistance, solvent resistance, impact resistance, and light fastness, suppresses occurrence of optical distortion (striae) due to the long pot life of the polymerizable composition, and is excellent in balance between these characteristics and has a high refractive index. Such a thiourethane urea resin can be suitably used for various optical materials required to have high transparency and particularly for spectacle lenses.

DESCRIPTION OF EMBODIMENTS

A polymerizable composition for an optical material of the present invention will be described based on the following embodiments.

The polymerizable composition for an optical material of the present embodiment includes at least one amine compound (A) selected from a compound (a1) represented by Formula (1) and a compound (a2) represented by Formula (2); an iso(thio)cyanate compound (B) which contains two or more iso(thio)cyanate groups; and a polythiol compound (C) which contains a dithiol compound (c1) containing two mercapto groups and a polythiol compound (c2) containing three or more mercapto groups.

Hereinafter, each component used in the present embodiment will be described in detail.

[Amine Compound (A)]

The amine compound (A) used in the polymerizable composition for an optical material of the present invention is formed of at least one selected from the compound (a1) represented by Formula (1) and the compound (a2) represented by Formula (2).

(Compound (a1))

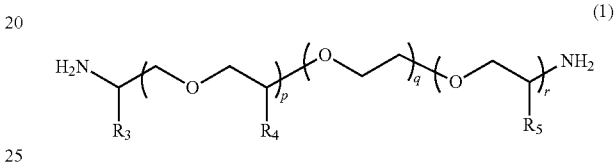

(1)

In Formula (1), $R_3$ to $R_5$ each independently represent a hydrogen atom or a methyl group. p represents an integer of 0 to 100, preferably an integer of 0 to 70, and more preferably an integer of 0 to 35. q represents an integer of 0 to 100, preferably an integer of 0 to 70, and more preferably an integer of 0 to 40. r represents an integer of 1 to 100, preferably an integer of 1 to 70, and more preferably an integer of 1 to 35. p+r represents an integer of 1 to 100, preferably an integer of 1 to 70, and more preferably an integer of 1 to 35. In a case where a plurality of $R_4$'s or $R_5$'s are present, $R_4$'s or $R_5$'s may be the same as or different from each other.

The weight-average molecular weight (MW) of the compound (a1) represented by Formula (1) can be set to be in a range of 100 to 4000, preferably in a range of 200 to 4000, more preferably in a range of 400 to 2000, and still more preferably in a range of 500 to 2000. From the viewpoint that the compound (a1) with a weight-average molecular weight in the above-described range has a mild reactivity with respect to iso(thio)cyanate so that a uniform prepolymer is obtained, the compound (a1) is preferable.

Examples of commercially available compounds represented by Formula (1) include HK-511, ED-600, ED-900, ED-2003, D-230, D-400, D-2000, and D-4000 (trade name, manufactured by HUNTSMAN Corporation), but the present invention is not limited to these exemplary compounds. These may be used alone or in the form of a mixture of two or more kinds thereof.

In the present embodiment, from the viewpoint of the effects of the present invention, a compound represented by Formula (1a), in which both of p and q represents 0, can be preferably used as the compound (a1).

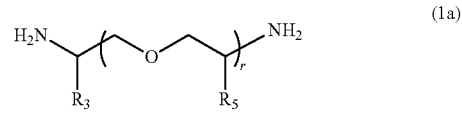

(1a)

In Formula (1a), $R_3$, $R_5$, and r each have the same definition as that for $R_3$, $R_5$, and r of Formula (1)

(Compound (a2))

The compound (a2) is represented by Formula (2).

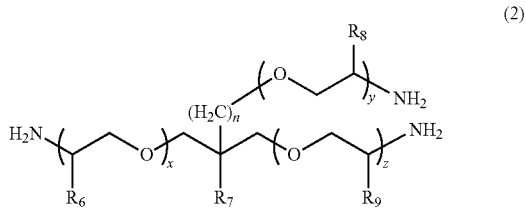

In Formula (2), $R_6$, $R_8$, and $R_9$ each independently represent a hydrogen atom or a methyl group. $R_7$ represents a linear alkyl group having 1 to 20 carbon atoms, a branched alkyl group having 3 to 20 carbon atoms, or a cyclic alkyl group having 3 to 20 carbon atoms. x+y+z represents an integer of 1 to 200. n represents an integer of 0 to 10. In a case where a plurality of $R_6$'s, $R_8$'s, or $R_9$'s are present, $R_6$'s, $R_8$'s, or $R_9$'s may be the same as or different from each other.

In the present embodiment, as the compound represented by Formula (2), x+y+z represents typically an integer of 1 to 200, preferably an integer of 1 to 100, and more preferably an integer of 1 to 50. n represents typically an integer of 0 to 10, preferably an integer of 0 to 5, and more preferably 0 or 1. The weight-average molecular weight (MW) of the compound represented by Formula (2) can be set to be in a range of 100 to 5000, preferably in a range of 400 to 5000, more preferably in a range of 400 to 3000, and still more preferably in a range of 500 to 2000. From the viewpoint that the compound (a2) with a weight-average molecular weight in the above-described range has a mild reactivity with respect to iso(thio)cyanate so that a uniform prepolymer is obtained, the compound (a2) is preferable.

Examples of the linear alkyl group having 1 to 20 carbon atoms as $R_7$ include a methyl group, an ethyl group, an n-propyl group, an n-butyl group, a pentyl group, a hexyl group, a heptyl group, an n-octyl group, a nonyl group, a decyl group, and a dodecyl group; examples of the branched alkyl group having 3 to 20 carbon atoms as $R_7$ include an isopropyl group, an isobutyl group, a t-butyl group, an isopentyl group, an isooctyl group, a 2-ethylhexyl group, a 2-propylpentyl group, and an isodecyl group; and examples of the cyclic alkyl group having 3 to 20 carbon atoms as $R_7$ include a cyclopropyl group, a cyclobutyl group, a cyclopentyl group, a cyclohexyl group, a cycloheptyl group, and a cyclooctyl group.

Examples of commercially available compounds represented by Formula (2) include T-403, T-3000 (XTJ-509), and T-5000 (trade name, manufactured by HUNTSMAN Corporation), but the present invention is not limited to these exemplary compounds. These may be used alone or in the form of a mixture of two or more kinds thereof.

[Iso(Thio)Cyanate Compound (B)]

The iso(thio)cyanate compound (B) used in the polymerizable composition for an optical material of the present invention is an iso(thio)cyanate compound containing two or more iso(thio)cyanate groups. Here, the iso(thio)cyanate compound indicates an isocyanate compound or an isothiocyanate compound.

Examples of the iso(thio)cyanate compound (B) include an aliphatic polyisocyanate compound, an alicyclic polyisocyanate compound, an aromatic polyisocyanate compound, a heterocyclic polyisocyanate compound, an aliphatic polyisothiocyanate compound, an alicyclic polyisothiocyanate compound, an aromatic polyisothiocyanate compound, and a sulfur-containing heterocyclic polyisothiocyanate compound and modified products of these.

More specific examples of the isocyanate compound include an aliphatic polyisocyanate compound such as pentamethylene diisocyanate, hexamethylene diisocyanate, 2,2,4-trimethylhexane diisocyanate, 2,4,4-trimethylhexamethylene diisocyanate, lysine diisocyanate methyl ester, lysine triisocyanate, m-xylylene diisocyanate, p-xylene diisocyanate, α,α,α',α'-tetramethylxylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, or bis(isocyanatomethylthio)ethane; an alicyclic polyisocyanate compound such as isophorone diisocyanate, bis(isocyanatomethyl)cyclohexane, dicyclohexylmethane-4,4'-diisocyanate, cyclohexane diisocyanate, methyl cyclohexane diisocyanate, dicyclohexyl dimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, or 4,9-bis(isocyanatomethyl)tricyclodecane; an aromatic polyisocyanate compound such as phenylene diisocyanate, 2,4-tolylene diisocyanate, 2,6-tolylene diisocyanate, 4,4-diphenylmethane diisocyanate, or diphenyl sulfide-4,4-diisocyanate; and a sulfur-containing heterocyclic polyisocyanate compound such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, or 4,5-bis(isocyanatomethyl)-1,3-dithiolane. One or two or more selected from these can be used in combination as the iso(thio) cyanate compound (B).

Further, a prepolymer type modified product with a halogen substitute such as a chlorine substitute or a bromine substitute of these, an alkyl substitute, an alkoxy substitute, a nitro substitute, or polyhydric alcohol, a carbodiimide modified product, a urea modified product, a burette modified product, or a dimerization or trimerization reaction product can be used.

Examples of the isothiocyanate compound include an aliphatic polyisothiocyanate compound such as hexamethylene diisothiocyanate, lysine diisothiocyanate methyl ester, lysine triisothiocyanate, m-xylylene diisothiocyanate, bis(isothiocyanatomethyl)sulfide, bis(isothiocyanatoethyl)sulfide, or bis(isothiocyanatoethyl)disulfide; an alicyclic polyisothiocyanate compound such as isophorone diisothiocyanate, bis(isothiocyanatomethyl)cyclohexane, dicyclohexylmethane diisothiocyanate, cyclohexane diisothiocyanate, methyl cyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, or 4,9-bis(isothiocyanatomethyl)tricyclodecane; an aromatic polyisothiocyanate compound such as tolylene diisothiocyanate, 4,4-diphenylmethane diisothiocyanate, or diphenyl sulfide-4,4-diisothiocyanate; and a sulfur-containing heterocyclic polyisothiocyanate compound such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, or 4,5-bis(isothiocyanatomethyl)-1,3-dithiolane. One or two or more selected from these can be used in combination as the iso(thio) cyanate compound (B).

Further, a prepolymer type modified product with a halogen substitute such as a chlorine substitute or a bromine substitute of these, an alkyl substitute, an alkoxy substitute, a nitro substitute, or polyhydric alcohol, a carbodiimide modified product, a urea modified product, a burette modified product, or a dimerization or trimerization reaction product can be used.

In the present embodiment, it is preferable that at least one selected from hexamethylene diisocyanate, pentamethylene diisocyanate, m-xylylene diisocyanate, isophorone diisocyanate, bis(isocyanatomethyl)cyclohexane, dicyclohexylmethane-4,4'-diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and 4,4'-diphenylmethane diisocyanate is used as the iso(thio) cyanate compound (B).

It is more preferable that at least one selected from m-xylylene diisocyanate, bis(isocyanatomethyl)cyclohexane, dicyclohexylmethane-4,4'-diisocyanate, 2,5-bis(isocyanatomethyl)bicyclo-[2.2.1]-heptane, and 2,6-bis(isocyanatomethyl)bicyclo-[2.2.1]-heptane is used as the iso(thio) cyanate compound (B).

[Polythiol Compound (C)]

The polythiol compound (C) used in the polymerizable composition for an optical material of the present invention includes both of a dithiol compound (c1) containing two mercapto groups and apolythiol compound (c2) containing three or more mercapto groups.

(Dithiol Compound (c1))

The dithiol compound (c1) is a thiol containing two mercapto groups, in other words, a divalent (bifunctional) thiol.

Examples of the dithiol compound (c1) include methane dithiol, 1,2-ethanedithiol, 1,2-cyclohexane dithiol, bis(2-mercaptoethyl)ether, diethylene glycol bis(2-mercaptoacetate), diethylene glycol bis(3-mercaptopropionate), ethylene glycol bis(2-mercaptoacetate), ethylene glycol bis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 2,5-dimercaptomethyl-1,4-dithiane, 2,5-dimercapto-1,4-dithiane, 2,5-dimercaptomethyl-2,5-dimethyl-1,4-dithiane, and esters of thioglycolic acid and mercaptopropionic acid of these; an aliphatic polythiol compound such as bis(2-mercaptoethyl)sulfide, hydroxymethyl sulfide bis(2-mercaptoacetate), hydroxymethyl sulfide bis(3-mercaptopropionate), hydroxymethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), or 4,6-bis(mercaptomethylthio)-1,3-dithiane; an aromatic polythiol compound such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 2,5-toluenedithiol, 3,4-toluenedithiol, 1,5-naphthalenedithiol, or 2,6-naphthalenedithiol; and a heterocyclic polythiol compound such as 2-methylamino-4,6-dithiol-sym-triazine, 3,4-thiophenedithiol, bismuthiol, 4,6-bis(mercaptomethylthio)-1,3-dithiane, or 2-(2,2-bis(mercaptomethylthio)ethyl)-1,3-dithietane.

From the viewpoint of the effects of the present invention, it is preferable that at least one compound selected from the group consisting of 2,5-dimercaptomethyl-1,4-dithiane, ethylene glycol bis(3-mercaptopropionate), 4,6-bis(mercaptomethylthio)-1,3-dithiane, 2-(2,2-bis(mercaptomethylthio)ethyl)-1,3-dithietane, and bis(2-mercaptoethyl)sulfide is used as the dithiol compound (c1).

It is particularly preferable that at least one compound selected from the group consisting of 2,5-dimercaptomethyl-1,4-dithiane, ethylene glycol bis(3-mercaptopropionate), 4,6-bis(mercaptomethylthio)-1,3-dithiane, and bis(2-mercaptoethyl)sulfide is used as the dithiol compound (c1).

(Polythiol Compound (c2))

The polythiol compound (c2) is a thiol containing three or more mercapto groups, in other words, a tri- (trifunctional) or higher polyvalent (polyfunctional) thiol.

Examples of the polythiol compound (c2) include 1,2,3-propanetrithiol, tetrakis(mercaptomethyl)methane, trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, and esters of thioglycolic acid and mercaptopropionic acid of these; an aliphatic polythiol compound such as 1,1,3,3-tetrakis(mercaptomethylthio)propane, 1,1,2,2-tetrakis(mercaptomethylthio)ethane, tris(mercaptomethylthio)methane, or tris(mercaptoethylthio)methane; an aromatic polythiol compound such as 1,3,5-trimercaptobenzene, 1,3,5-tris(mercaptomethyl)benzene, 1,3,5-tris(mercaptomethyleneoxy)benzene, or 1,3,5-tris(mercaptoethyleneoxy)benzene; and a heterocyclic polythiol compound such as 2,4,6-trimercapto-s-triazine, 2,4,6-trimercapto-1,3,5-triazine.

From the viewpoint of the effects of the present invention, it is preferable that at least one compound selected from the group consisting of trimethylolpropane tris(3-mercaptopropionate), pentaerythritol tetrakis(2-mercaptoacetate), pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 1,1,3,3-tetrakis(mercaptomethylthio)propane is used as the polythiol compound (c2) which can be used in the present embodiment.

It is particularly preferable that at least one compound selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane is used as the polythiol compound (c2).

In the present embodiment, a ratio (c1/c2) of a molar number c1 of the mercapto group in the dithiol compound (c1) to a molar number c2 of the mercapto group in the polythiol compound (c2) can be set to be in a range of 1 to 13, preferably in a range of 1 to 11, and more preferably in a range of 1 to 9.

Further, the molar number c1 of the mercapto group in the dithiol compound (c1) and the molar number c2 of the mercapto group in the polythiol compound (c2) can be calculated from the number and the molecular weight of mercapto groups contained in the thiol to be used and the amount of the thiol to be used. Alternatively, these molar numbers c1 and c2 can be acquired using a method known in the field such as titration.

In a case where the mole ratio is in the above-described range, it is possible to obtain a thiourethane urea resin molded body which has a low specific gravity and excellent transparency, heat resistance, solvent resistance, impact resistance, and light fastness, suppresses occurrence of optical distortion (striae) due to the long pot life of the polymerizable composition, and is excellent in balance between these characteristics and has a high refractive index.

[Polyol Compound (D)]

In the present embodiment, the polymerizable composition for an optical material contains a polyol compound (D) containing two or more hydroxy groups as necessary. The polyol compound (D) is alcohol containing two or more hydroxy groups, in other words, di-(bifunctional) or higher polyhydric alcohol.

Examples of the polyol compound which is di- or higher polyhydric alcohol include a linear, branched, or cyclic aliphatic polyol such as 1,2-ethanediol, 1,3-propanediol, 1,2-propanediol, 1,4-butanediol, 1,3-butanediol, glycerol, neopentyl glycol, trimethylolethane, trimethylolpropane, ditrimethylolpropane, erythritol, pentaerythritol, dipentaerythritol, diethylene glycol, dipropylene glycol, higher polyalkylene glycol, cyclobutanediol, cyclopentanediol, cyclohexanediol, cycloheptanediol, cyclooctanediol, cyclohexane dimethanol, tricyclohexane dimethanol, tricyclodecane dimethanol, tripropylene glycol, polypropylene glycol (diol type), polycaprolactone triol, ethylene glycol, diethylene glycol, triethylene glycol, propylene glycol, dipropylene glycol, tripropylene glycol, hydroxypropylcyclohexanol, tricycle[5,2,1,0,2,6]decane-dimethanol, bicyclo[4,3,0]-nonanediol, dicyclohexanediol, tricycle[5,3,1,1]dodecanediol, bicyclo[4,3,0]nonanedimethanol, tricycle[5,3,1,1]dodecane-diethanol, hydroxypropyl tricycle[5,3,1,1]dodecanol, spiro[3,4]octanediol, butyl cyclohexanediol, 1,1'-bicyclohexylidenediol, cyclohexane triol, naltitol, or lactitol; and an aromatic polyol such as cyclohexane diethanol dihydroxy benzene, benzene triol, hydroxy benzyl alcohol, dihydroxy toluene, 4,4'-oxybisphenol, 4,4'-dihydroxybenzophenone, 4,4'-thiobisphenol, phenolphthalein, bis(4-hydroxyphenyl)methane, 4,4'-(1,2-ethenediyl)bisphenol, 4,4'-sulfonylbisphenol, 4,4'-isopropylidenebis(2,6-dibromophenol), 4,4'-isopropylidenebis(2,6-dichlorophenol), 4,4'-isopropylidenebis(2,3,5,6-tetrachlorophenol), 4,4'-isopropylidene-biscyclohexanol, 4,4'-oxybiscyclohexanol, 4,4'-thiobiscyclohexanol, or bis(4-hydroxycyclohexanol)methane, but the present invention is not limited to these.

Among these, from the viewpoint that the resin to be obtained has a lower haze and excellent heat resistance, it is preferable that a diol compound (d1) containing two hydroxy groups is used as the polyol compound (D).

It is preferable that at least one selected from a linear aliphatic diol compound, a branched aliphatic diol compound, a cyclic aliphatic diol compound, and an aromatic diol compound is used as the diol compound (d1).

Among these, from the viewpoints of the handleability of the polymerizable composition and the heat resistance of the molded body to be obtained, it is preferable that cyclohexane dimethanol, tricyclodecane dimethanol, or polypropylene glycol such as propylene glycol, dipropylene glycol, or tripropylene glycol is used as the diol compound (d1).

(Other Components)

The polymerizable composition for an optical material of the present embodiment may further contain additives such as a polymerization catalyst, an internal release agent, a resin modifier, a light stabilizer, a bluing agent, an ultraviolet absorbing agent, an antioxidant, a coloring inhibitor, a dye, and a photochromic dye depending on the characteristics to be desired for the applications.

In other words, a modifier can be added to the polymerizable composition of the present embodiment within the range not impairing the effects of the present invention for the purpose of adjusting various physical properties such as the optical properties, the impact resistance, and the specific gravity of the molded body to be obtained and adjusting the handleability of each component of the polymerizable composition.

(Polymerizable Catalyst)

Examples of the catalyst include a Lewis acid, a tertiary amine, an organic acid, and an amine organic acid salt. Among these, a Lewis acid, an amine, and an amine organic acid salt are preferable, and dimethyl tine chloride, dibutyl tin chloride, and dibutyl tin laurate are more preferable.

(Internal Release Agent)

The polymerizable composition of the present embodiment may contain an internal release agent for the purpose of improving the release properties from a mold after molding.

Acidic phosphoric acid ester can be used as the internal release agent. Examples of the acidic phosphoric acid ester include phosphoric acid monoester and phosphoric acid diester. These may be used alone or in the form of a mixture of two or more kinds thereof.

Examples of commercially available products of the internal release agent include ZelecUN (manufactured by STEPAN Company), an internal release agent for MR (manufactured by Mitsui Chemicals, Incorporated), JP Series (manufactured by JOHOKU CHEMICAL CO., LTD.), Phosphanol Series (manufactured by TOHO Chemical Industries Co., Ltd.), AP Series and DP Series (manufactured by DAIHACH INDUSTRY CO., LTD.).

(Resin Modifier) Further, a resin modifier can be added to the polymerizable composition of the present embodiment within the range not impairing the effects of the present invention for the purpose of adjusting various physical properties such as the optical properties, the impact resistance, and the specific gravity of the resin to be obtained and adjusting the viscosity or the pot life of the composition.

Examples of the resin modifier include an episulfide compound, an alcohol compound different from the polyol compound, an amine compound different from the amine compound, an epoxy compound, and an olefin compound containing an organic acid and an anhydride thereof or a (meth)acrylate compound.

(Light Stabilizer)

A hindered amine-based compound can be used as the light stabilizer. Examples of the hindered amine-based compound include Lowilite 76 and Lowilite 92 (manufactured by Chemtura Corporation), Tinuvin 144, Tinuvin 292, and Tinuvin 765 (manufactured by BASF SE), Adekastab LA-52, and LA-72 (manufactured by ADEKA Corporation), and JF-95 (manufactured by JOHOKU CHEMICAL CO., LTD.).

(Bluing Agent)

As the bluing agent, those having an absorption band in a wavelength range from orange to yellow in the visible light region and having a function of adjusting the hue of an optical material formed of a resin may be exemplified. Specific examples thereof include substances showing blue to purple colors.

(Ultraviolet Absorbing Agent)

Examples of the ultraviolet absorbing agent include a benzophenone-based compound, a triazine-based compound, and a benzotriazole-based compound.

Examples of the ultraviolet absorbing agent include a benzophenone-based ultraviolet absorbing agent such as 2,2'-dihydroxy-4-methoxybenzophenone, 2-hydroxy-4-acryloyloxybenzophenone, 2-hydroxy-4-acryloyloxy-5-tert-butylbenzophenone, or 2-hydroxy-4-acryloyloxy-2'4'-dichlorobenzophenone; a triazine-based ultraviolet absorbing agent such as 2-[4-[(2-hydroxy-3-dodecyloxypropyl)oxy]-2-hydroxyphenyl]4,6-bis(2,4-dimethylphenyl)-1,3,5-triazine, 2-[4-(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, or 2-(2-hydroxy-4-[1-octyloxycarbonylethoxy]phenyl)-4,6-bis(4-pheny lphenyl)-1,3,5-triazine; and a benzotriazole-based ultraviolet absorbing agent such as 2-(2H-benzotriazole-2-yl)-4-methylphenol, 2-(2H-benzotriazole-2-yl)-4-tert-octylphenol, 2-(2H-benzotriazole-2-yl)-4,6-bis(1-methyl-1-phenylethyl)phenol, 2-(2H-benzotriazole-2-yl)-4,6-di-tert-pentylphenol, 2-(5-chloro-2H-benzoatriazole-2-yl)-4-methyl-6-tert-butylphenol, 2-(5-chloro-2H-benzotriazole-2-yl)-2,4-tert-butylphenol, or 2,2'-methylenebis[6-(2H-benzotriazole-2-yl)-4-(1,1,3,3-tetrameth ylbutyl)phenol]. Among these, a benzotriazole-based ultraviolet absorbing agent such as 2-(2H-benzotriazole-2-yl)-4-tert-octylphenol or 2-(5-chloro-2H-benzotriazole-2-yl)-4-methyl-6-tert-butylphenol is preferably exemplified. These ultraviolet absorbing agents can be used alone or in combination of two or more kinds thereof.

<Method of Producing Polymerizable Composition for Optical Material>

The polymerizable composition for an optical material of the present embodiment contains the amine compound (A), the iso(thio)cyanate compound (B), and the polythiol compound (C).

In the polymerizable composition for an optical material of the present embodiment, the ratio (a/b) of the molar number a of the amino group in the amine compound (A) to the molar number b of the iso(thio)cyanate group in the iso(thio)cyanate compound (B) is in a range of 0.01 to 0.20 and preferably in a range of 0.01 to 0.18.

In a case where the amine compound (A), the iso(thio) cyanate compound (B), and the polythiol compound (C) are used in combination and the ratio of this molar number is satisfied, it is possible to more suitably obtain a thiourethane urea resin molded body which has a low specific gravity and excellent heat resistance, solvent resistance, impact resistance, and light fastness, suppresses occurrence of optical distortion (striae) due to the long pot life of the polymerizable composition, and has a high refractive index, in other words, a thiourethane urea resin molded body which is excellent in balance between these characteristics. The polymerizable composition for an optical material of the present embodiment can exhibit the effects of the present invention described above and a suitable resin for spectacle lenses can be obtained from the composition.

Further, from the viewpoint of the effects of the present invention, a ratio ((a+c)/b) of a total molar number (a+c), which is the molar number a of the amino group in the amine compound (A) and the molar number c of the mercapto group in the polythiol compound (C), to the molar number b of the iso(thio)cyanate group in the iso(thio) cyanate compound (B) is in a range of 0.70 to 1.30, preferably in a range of 0.70 to 1.20, and more preferably in a range of 0.90 to 1.10.

In a case where the polyol compound (D) is used, a molar number d of the hydroxy group in the polyol compound (D) to the molar number c of the mercapto group in the polythiol compound (C) is in a range of 0.01 to 0.7 and preferably in a range of 0.02 to 0.6. In a case where the polyol compound (D) is used, a resin with a high refractive index and excellent transparency and heat resistance can be obtained without degrading the impact resistance by adjusting the ratio to be in the above-described range.

In a case where the polyol compound (D) is used, a ratio ((a+c+d)/b) of a total molar number (a+c+d), which is the molar number a of the amino group in the amine compound (A), the molar number c of the mercapto group in the polythiol compound (C), and the molar number d of the hydroxy group in the polyol compound (D), to the molar number b of the iso(thio)cyanate group in the iso(thio) cyanate compound (B) is in a range of 0.7 to 1.30, preferably in a range of 0.70 to 1.20, and more preferably in a range of 0.90 to 1.10.

In addition, the molar number a of the amino group in the amine compound (A), the molar number b of the iso(thio) cyanate group in the iso(thio) cyanate compound (B), the molar number c of the mercapto group in the polythiol compound (C), and the molar number d of the hydroxy group in the polyol compound (D) can be theoretically acquired respectively from the number of functional groups and the molecular weight or the weight-average molecular weight of the compound to be used and the amount of the compound to be used. Alternatively, these molar numbers can be acquired using a method known in the field such as titration.

The polymerizable composition for an optical material of the present embodiment is prepared according to a method of mixing the amine compound (A), the iso(thio) cyanate compound (B), the polythiol compound (C), and other components at once or a method of reacting the amine compound (A) with the iso(thio)cyanate compound (B) to obtain a prepolymer and adding the polythiol compound (C) to the prepolymer so as to be mixed thereinto.

In the present embodiment, the polymerizable composition for an optical material is prepared according to a method of mixing the amine compound (A), the iso(thio) cyanate compound (B), the polythiol compound (C), the polyol compound (D), and other components as necessary at once, a method of reacting the amine compound (A) with the iso(thio) cyanate compound (B) to obtain a prepolymer, adding the polythiol compound (C) to the prepolymer, and adding the polyol compound (D) thereto so as to be mixed, a method of reacting the amine compound (A) with the iso(thio)cyanate compound (B) to obtain a prepolymer, adding the polyol compound (D) to the prepolymer, and adding the polythiol compound (C) thereto, or a method of reacting the amine compound (A) with the iso(thio)cyanate compound (B) to obtain a prepolymer and adding a mixture of the polythiol compound (C) and the polyol compound (D) to the prepolymer.

In a case where the polymerizable composition for an optical material is prepared by mixing the compounds at once, monomers such as the amine compound (A), the iso(thio)cyanate compound (B), and the polythiol compound (C), a catalyst, an internal release agent, and other additives are mixed to obtain the polymerizable composition at a temperature of usually 25° C. or lower. From the viewpoint of the pot life of the polymerizable composition, it is preferable that the polymerizable composition is mixed at a lower temperature in some cases. However, in a case where the solubility of the catalyst, the internal release agent, and the additives in the monomers is not excellent, the catalyst, the internal release agent, and the additives can be dissolved in the monomers and the resin modifier by increasing the temperature in advance.

In a case where the polyol compound (D) is used, the polymerizable composition for an optical material can be prepared under the same conditions as described above.

In a case where the polymerizable composition for an optical material is prepared according to a prepolymer method, the method includes a step (i) of reacting the amine compound (A) with the bi- or higher functional iso(thio) cyanate compound (B) to obtain a prepolymer and a step (ii) of adding the polythiol compound (C) to the prepolymer so as to be mixed thereinto.

Hereinafter, each step will be described.

[Step (i)]

In the step (i), the iso(thio)cyanate compound (B) is charged with a predetermined amine compound (A) at once or in a divided manner, and these are allowed to react with each other. The ratio (a/b) of the molar number a of the amino group in the amine compound (A) to the molar number b of the iso(thio)cyanate group in the iso(thio) cyanate compound (B) is in a range of 0.01 to 0.20 and preferably in a range of 0.01 to 0.18.

In a case where the amine compound (A), the iso(thio) cyanate compound (B), and the polythiol compound (C) are mixed at once, the heat of the reaction is increased and thus the pot life is shortened. Therefore, the workability to the casting is degraded and the striae occurs in a resin molded body to be obtained in some cases. Further, since polymerization advances before the components are uniformly dissolved, a resin molded body with impaired transparency is obtained in some cases. According to the present embodiment, a resin molded body with excellent transparency and suppressed striae can be suitably obtained by reacting the amine compound (A) with the iso(thio)cyanate compound (B) to obtain a prepolymer and adding the polythiol compound (C) to this prepolymer so as to be mixed thereinto.

The reaction between the amine compound (A) and the iso(thio)cyanate compound (B) may be performed in the presence of the additives. Since the reaction temperature varies depending on the compound to be used, the kind of additives, the used amount, and the properties of the prepolymer to be generated, the reaction temperature is not limited unconditionally and is appropriately selected in consideration of the operability, the safety, the convenience, and the like.

[Step (ii)]

In the step (ii), the polymerizable composition is obtained by further adding the polythiol compound (C) to the prepolymer obtained in the step (i) so as to be mixed thereinto. Since the mixing temperature varies depending on the compound to be used, the mixing temperature is not limited unconditionally and is appropriately selected in consideration of the operability, the safety, the convenience, and the like, but is preferably 25° C. or lower. Depending on the solubility of the compound to be used, the compound may be heated. The heating temperature is determined in consideration of the stability and the safety of the compound.

In a case where a prepolymer is obtained using the iso(thio)cyanate compound (B) and the polythiol compound (C) in the step (i), the amine compound (A) is added to and mixed with the prepolymer obtained in the step (i) to obtain a polymerizable composition in the subsequent step (ii), since an isocyanate residue remains in the prepolymer obtained in the step (i), the heat of the reaction with the amine compound (A) is increased and thus the pot life is shortened. Therefore, the workability to the casting is significantly degraded and striae occurs in the resin molded body to be obtained in some cases.

On the contrary, according to the method of producing the polymerizable composition for an optical material using the above-described prepolymer method, since a prepolymer is obtained by reacting the amine compound (A) with the iso(thio) cyanate compound (b) in the above-described range of the mole ratio a/b during the step (i) and the amino group does not almost remain in the amine compound (A), the above-described problems do not occur.

A molded body can be obtained by curing the polymerizable composition for an optical material of the present embodiment.

In a case where the polyol compound (D) is used, it is preferable that the polyol compound (D) is added to and mixed with the prepolymer obtained in the step (i) during the step (ii) as described above. The addition of the polyol compound (D) may be carried out before, after, or simultaneously with the addition of the polythiol compound (C) and the mixture of the polythiol compound (C) and the polyol compound (D) may be added to the prepolymer.

<Method of Producing Optical Material>

In the present embodiment, the optical material formed of a thiourethane urea resin molded body is not particularly limited, but can be obtained by performing cast polymerization including the following step as a preferable production method.

Step a1: casting the polymerizable composition for an optical material of the present embodiment into a mold Step b1: heating the polymerizable composition for an optical material and polymerizing and curing the composition to obtain a cured product (thiourethane urea resin molded body)

[Step a1]

First, the polymerizable composition is injected into a forming mold held by a gasket or tape. At this time, depending on the physical properties required for aplastic lens to be obtained, it is preferable that a defoaming treatment under reduced pressure or a filtration treatment under pressure or reduced pressure is performed as necessary in many cases.

[Step b1]

Since the conditions for polymerization significantly vary depending on the composition of the polymerizable composition, the kind and the used amount of the catalyst, the shape of the mold, and the like, the conditions are not limited, and the polymerization is typically performed in a temperature range of −50° C. to 150° C. for 1 to 50 hours. In some cases, it is preferable that the temperature is held to be in a range of 10° C. to 150° C. or is gradually increased and the composition is cured for 1 to 25 hours.

The optical material formed of a thiourethane urea resin of the present embodiment may be subjected to an annealing treatment or the like as necessary. The treatment temperature is performed typically in a temperature range of 50° C. to 150° C., preferably in a temperature range of 90° C. to 140° C., and more preferably in a temperature range of 100° C. to 130° C.

In the present embodiment, during the molding of the optical material formed of a thiourethane urea resin, various additives such as a chain extender, a crosslinking agent, an oil-soluble dye, a filler, and an adhesion improver may be added in addition to the above-described "other components", similar to a known molding method depending on the purpose thereof.

An optical materials in various shapes can be obtained from the polymerizable composition of the present embodiment by changing the mold at the time of cast polymerization. In a case where the optical material of the present embodiment has a desired shape and includes a coating layer and other members to be formed as necessary, an optical material in various shapes can be obtained.

<Plastic Spectacle Lens>

The optical material obtained by curing the polymerizable composition for an optical material of the present embodiment can be used as a lens base material for a spectacle lens. One or both surfaces of this lens base material are provided with a coating layer as necessary and used. Examples of the coating layer include a hard coat layer, an antireflection layer, an antifogging coat film layer, an antifouling layer, a water-repellent layer, a primer layer, and a photochromic layer. These coating layers may be used alone or a plurality of coating layers may be multilayered and used. In a case where both surfaces of the optical material are provided with a coating layer, both layers are provided with the same coating layer or different coating layers.

In a case where the optical material of the present embodiment is applied to a spectacle lens, a hard coat layer and/or an antireflection coat layer can be formed on at least one surface of the optical material (lens base material) obtained by curing the polymerizable composition of the present embodiment. Further, other layers described above may be provided on at least one surface thereof.

Since a lens formed of a specific polymerizable composition of the present invention is used as the spectacle lens obtained in the above-described manner, the impact resistance is excellent even in a case where these coating layers are provided.

The hard coat layer is a coating layer which is provided on at least one surface of the optical material (lens base material) obtained by curing the polymerizable composition of the present embodiment for the purpose of imparting functions of scratch resistance, abrasion resistance, moisture resistance, hot water resistance, heat resistance, and light fastness to a surface of the spectacle lens to be obtained. The hard coat layer is obtained from a composition that contains one or more metal oxides selected from the element group consisting of silicon, titanium, zirconium, tin, aluminum, tungsten, and antimony; a silane compound containing at least one functional group selected from an alkyl group, an allyl group, an alkoxy group, a methacryloxy group, an acryloxy group, an epoxy group, an amino group, an isocyanate group, and a mercapto group; and hydrolyzates thereof.

The hard coat composition may contain a curing agent for the purpose of promoting curing. Specific examples of the curing agent include an inorganic acid, an organic acid, an amine, a metal complex, an organic acid metal salt, and a metal chloride. A solvent may be used for preparing the hard coat composition. Specific examples of the solvent include water, alcohols, ethers, ketones, and esters.

The hard coat layer is formed by coating a surface of the lens base material with the hard coat composition according to a known coating method such as spin coating or dip coating and curing the composition. Examples of the curing method include a heat curing method and a curing method of performing curing by irradiation with energy rays such as ultraviolet rays or visible rays. In a case of heating and curing the composition, it is preferable that the heating and curing are performed at 80° C. to 120° C. for 1 to 4 hours. In order to suppress occurrence of interference fringes, a difference in refractive index between the hard coat layer and the molded body is preferably ±0.1.

It is preferable that the surface of the lens base material is ultrasonically washed with an alkali aqueous solution so as to satisfy the following conditions (a) to (d) before the hard coat layer is imparted.

(a) The alkali aqueous solution is a 5 to 40% sodium hydroxide or potassium hydroxide aqueous solution, (b) the treatment temperature of the alkali aqueous solution is in a range of 30° C. to 60° C., (c) the treatment time is in a range of 3 to 5 minutes, and (d) the ultrasonic frequency is in a range of 20 to 30 kHz.

After the lens base material is washed with an alkali aqueous solution, the lens base material is washed with distilled water or alcohols such as isopropanol, and the surface of the lens base material may be dried in a temperature range of 50° C. to 80° C. for 5 minutes to 20 minutes.

The lens base material formed of the molded body obtained from the polymerizable composition of the present embodiment has excellent alkali resistance, and thus occurrence of cloudiness or the like is suppressed even after the lens base material is washed with an alkali aqueous solution.

The antireflection layer is a coating layer which is provided on at least one surface of the molded body (lens base material) for the purpose of decreasing the reflectivity occurring from a difference in refractive index between the air and the molded body and drastically reducing the reflection of light on the surface of the plastic spectacle lens to be obtained in order to increase the transmittance. The antireflection layer of the present embodiment is formed of a low refractive index film layer containing silicon oxide and a high refractive index film layer containing one or more metal oxides selected from titanium oxide, zirconium oxide, aluminum oxide, zinc oxide, cerium oxide, antimony oxide, tin oxide, and tantalum oxide, and each layer may have a single layer structure or a multilayer structure.

In a case where the antireflection layer has a multilayer structure, it is preferable that five to seven layers are laminated. The film thickness thereof is preferably in a range of 100 to 300 nm and more preferably in a range of 150 to 250 nm. Examples of the method of forming a multilayer antireflection layer include a vacuum deposition method, a sputtering method, an ion plating method, an ion beam assist method, and a CVD method.

An antifogging coat film layer, an antifouling layer, or a water-repellent layer may be formed on the antireflection layer as necessary. As the method of forming an antifogging coat layer, an antifouling layer, or a water-repellent layer, known antifogging coating treatment methods, antifouling treatment methods, water-repellent treatment methods, and materials can be used without particularly limiting the treatment methods and the treatment materials thereof as long as the antireflection function is not adversely affected. Examples of the antifogging coating and antifouling methods include a method of covering the surface with a surfactant, a method of imparting a hydrophilic film to the surface to obtain water absorbency, a method of covering the surface with fine irregularities to increase the water absorbency, a method of using photocatalytic activity to obtain water absorbency, and a method of performing a super water-repellent treatment to prevent adhesion of water droplets. Further, examples of the water-repellent treatment method include a method of performing vapor deposition or sputtering on a fluorine-containing silane compound to form a water-repellent treatment layer and a method of dissolving a fluorine-containing silane compound in a solvent and performing coating to form a water-repellent treatment layer.

An ultraviolet absorbing agent for the purpose of protecting lenses and eyes from ultraviolet rays; an infrared absorbing agent for the purpose of protecting eyes from infrared rays; a light stabilizer or an antioxidant for the purpose of improving the weather resistance of lenses; a dye or a pigment for the purpose of improving the fashionability of lenses; and a photochromic dye, a photochromic pigment, an antistatic agent, and other known additives for the purpose of improving the performance of lenses may be blended with these coating layers. Various leveling agents for the purpose of improving coating properties may be used for a layer to be coated by performing application.

The optical material obtained by using the polymerizable composition of the present embodiment may be dyed using a pigment according to the purpose thereof and then used for the purpose of imparting fashionability or photochromic properties. Lenses can be dyed according to known dyeing methods, but are typically dyed using the following method.

Typically, a method of immersing (dyeing step) lens fabric finished on a predetermined optical surface in a dyeing solution obtained by dissolving or uniformly dispersing a pigment to be used and heating the lens to fix (annealing step after dyeing) the pigment is used. The pigment used in the dyeing step is not particularly limited as long as the pigment is a known pigment, but an oil-soluble dye or a disperse dye is typically used. The solvent used in the dyeing step is not particularly limited as long as the pigment to be used can be dissolved or uniformly dispersed. In the dyeing step, a surfactant for dispersing the pigment in the dyeing solution or a carrier for promoting the dye may be added as necessary.

In the dyeing step, dyeing is performed at a predetermined temperature for a predetermined time by dispersing a pigment and a surfactant to be added as necessary in water or a mixture of water and an organic solvent to prepare a dyebath and immersing an optical lens in this dyebath. The dyeing temperature and the time vary depending on the desired coloring concentration, but the dyeing may be typically performed at 120° C. or lower for several minutes to several tens of hours and the dyeing is also performed such that the dye concentration of the dyebath is in a range of 0.01% to 10% by weight. Further, in a case where dyeing is difficult to perform, the dyeing may be carried out under pressure.

The annealing step after dyeing to be performed as necessary is a step of performing a heat treatment on the dyed lens fabric.

The heat treatment is performed by removing water remaining on the surface of the lens fabric dyed in the dyeing step with a solvent or the like or drying the solvent with air and allowing the lens fabric to remain in a furnace such as an infrared heating furnace or a resistance heating furnace in an air atmosphere for a predetermined time. By performing the annealing step after dyeing, color loss of the dyed lens fabric is prevented (color loss prevention treatment) and the moisture having permeated into the lens fabric during dyeing is removed. In the present embodiment, unevenness after dyeing is small in a case where an alcohol compound is not contained.

<Plastic Polarized Lens>

The optical material obtained by curing the polymerizable composition for an optical material of the present embodiment can be used as a lens base material for a plastic polarized lens. In the present embodiment, the plastic polarized lens includes a polarizing film; and a base material layer (lens base material) which is formed on at least one surface of the polarizing film and is formed of a molded body to be obtained by curing the polymerizable composition for an optical material of the present embodiment.

The polarizing film of the present embodiment may be formed of a thermoplastic resin. Examples of the thermoplastic resin include a polyester resin, a polycarbonate resin, a polyolefin resin, a polyimide resin, a polyvinyl alcohol resin, and a polyvinyl chloride resin. From the viewpoints of water resistance, heat resistance, and moldability, a polyester resin or a polycarbonate resin is preferable and a polyester resin is more preferable.

Examples of the polyester resin include polyethylene terephthalate, polyethylene naphthalate, and polybutylene terephthalate. Among these, from the viewpoints of water resistance, heat resistance, and moldability, polyethylene terephthalate is preferable.

Specific examples of the polarizing film include a dichroic dye-containing polyester polarizing film, an iodine-containing polyvinyl alcohol polarizing film, and a dichroic dye-containing polyvinyl alcohol polarizing film.

The polarizing film may be used after being subjected to a heat treatment so that the film is dried and stabilized.

Further, in order to improve the adhesiveness to an acrylic resin, the polarizing film may be used after being subjected to one or two or more pre-treatments selected from a primer coating treatment, a chemical treatment (a liquid chemical treatment using a gas or an alkali), a corona discharge treatment, a plasma treatment, an ultraviolet irradiation treatment, an electron beam irradiation treatment, a roughening treatment, and a flame treatment. Among these pre-treatments, one or two or more treatments selected from a plasma coating treatment, a chemical treatment, a corona discharge treatment, and a plasma treatment are particularly preferable.

The plastic polarized lens of the present embodiment is obtained by laminating the base material layer obtained by curing the polymerizable composition for an optical material of the present embodiment on one surface of the objective surface side and the eyepiece surface side of the polarizing film or both surfaces of the objective surface side and the eyepiece surface side of the polarizing film.

The base material layer of the present embodiment may include a layer formed of a plastic material such as an acrylic resin, an allyl carbonate resin, a polycarbonate resin, a polyurethane resin, a polythiourethane resin, or a polysulfide resin, in addition to the layer formed of a cured product of the polymerizable composition of the optical material of the present embodiment.

The plastic polarized lens of the present embodiment is not particularly limited and can be prepared according to a method of adhering the lens base material produced in advance to both surfaces of the polarizing film or a method of cast-polymerizing the polymerizable composition on both surfaces of the polarizing film. In the present embodiment, an example in which the plastic polarized lens is formed using a cast polymerization method will be described.

In the present embodiment, the plastic polarized lens can be obtained using, for example, a production method including the following steps.

Step a2: The polarizing film is fixed into the mold for casting a lens in a state in which at least one surface of the polarizing film is separated from the mold.

Step b2: The polymerizable composition of the present embodiment is injected into a gap between the polarizing film and the mold.

Step c2: The polymerizable composition is heated, the composition is polymerized and cured, and the base material layer formed of the cured product of the polymerizable composition of the present embodiment is laminated on at least one surface of the polarizing film.

Hereinafter, each step will be sequentially described.

[Step a2]

The polarizing film formed of thermoplastic polyester and the like is disposed in a space of a mold for casting a lens so as to be parallel with the mold inner surface facing at least one film surface. A gap is formed between the polarizing film and the mold.

The polarizing film may be shaped in advance.

[Step b2]

Next, the polymerizable composition for an optical material of the present embodiment is injected, using predetermined injection means, into the gap between the mold and the polarizing film in the space of the mold for casting a lens.

[Step c2]

Next, the mold for casting a lens into which the polymerizable composition for an optical material has been injected and to which the polarizing film has been fixed is heated in a heatable device in an oven or in water for several hours to several tens of hours according to a predetermined temperature program and then cured and formed.

The temperature of the polymerization curing is not limited because the conditions for polymerization curing vary depending on the composition of the polymerizable composition, the kind of the catalyst, the shape of the mold, and the like, but the polymerization curing is performed in a temperature range of 0° C. to 140° C. for 1 hour to 48 hours.

After the curing and molding are completed, the plastic polarized lens of the present embodiment formed by laminating the layer formed of the cured product of the polymerizable composition of the present embodiment on at least one surface of the polarizing film can be obtained by being taken out from the mold for casting a lens.

It is desirable that the plastic polarized lens of the present embodiment is subjected to an annealing treatment by heating a released lens for the purpose of reducing the distortion caused by the polymerization.

The plastic polarized lens of the present embodiment is used by providing a coating layer on one or both surfaces thereof as necessary. Examples of the coating layer include a primer layer, a hard coat layer, an antireflection layer, an antifogging coat layer, an antifouling layer, and a water-repellent layer, similar to the plastic spectacle lens.

<Applications>

Next, the applications of the optical material of the present embodiment will be described.

Examples of the applications of the optical material of the present embodiment include various plastic lenses such as plastic spectacle lenses, goggles, spectacle lenses for correcting the vision, lenses for an imaging device, Fresnel lenses for a liquid crystal projector, lenticular lenses, and contact lenses, a sealing material for a light emitting diode (LED), an optical waveguide, an optical adhesive used for bonding an optical lens or an optical waveguide, an antireflection film used for an optical lens or the like, a transparent coating used for a liquid crystal display device member (such as a substrate, a light guide plate, a film, or a sheet), a sheet or film attached to a windshield of a car or a helmet of a motorbike, and a transparent substrate.

Hereinbefore, the present invention has been described based on the embodiments, but the present invention is not limited to the above-described embodiments and various modes can be employed within the range not impairing the effects of the invention of the present application.

EXAMPLES

Hereinafter, the present invention will be described in more detail based on the following examples, but the present invention is not limited thereto.

First, the evaluation method in the examples of the present invention will be described.

<Evaluation Method>

Transparency: The obtained resin was applied to a projector in a dark place, and the cloudiness (including elution from the tape) and the presence or absence of a non-transparent material were determined by visual observation. In a case where the cloudiness (including elution from the tape) and a non-transparent material were not found, this was evaluated as "A" (transparent), and in a case where a non-transparent material was found, this was evaluated as "C" (not transparent).

HAZE: The haze value of a flat plate resin with a thickness of 2.5 mm was measured using a haze meter (model number: NDH 2000, manufactured by NIPPON DENSHOKU INDUSTRIES Co., Ltd.). A lens can be used without problems in a case where the haze value is less than 0.70.

Distortion (striae): The obtained lens was projected on a high-pressure UV lamp. In a case where distortion was not found in the lens, this was evaluated as "A" (no striae), in a case where distortion was not found in the lens by visual observation, this was evaluated as "B", and in a case where distortion was found in the lens by visual observation, this was evaluated as "C" (with striae).

Refractive index (ne) and Abbe number (ve): The measurement was performed at 20° C. using a Pulfrich refractometer.

Heat resistance: The glass transition temperature Tg was measured according to a TMA penetration method (load of 50 g, pin tip of 0.5 mmϕ, temperature rising rate of 10° C./min).

Specific gravity: The measurement was performed according to an Archimedes method.

Impact resistance: In conformity with US FDA, light steel balls to heavy steel balls were sequentially dropped from a height of 127 cm onto a lens having a center thickness of 1 mm until the lens was broken, and the impact resistance was evaluated based on the weight of the steel ball causing the breakage. The measurement was performed in order of 8 g of a steel ball, 16 g of a steel ball, 28 g of a steel ball, 33 g of a steel ball, 45 g of a steel ball, 67 g of a steel ball, 95 g of a steel ball, 112 g of a steel ball, 174 g of a steel ball, 225 g of a steel ball, and 530 g of a steel ball. Further, the notation ">530 g" in the tables indicates that the lens was not broken even in a case where 530 g of a steel ball was dropped.

Light fastness: A QUV test (light source: UVA-340, intensity: 0.50 W/m$^2$, test conditions: 50° C.×200 hours) was performed using a flat plate having a thickness of 2 mm with a weather meter (manufactured by Q-Lab Corporation), and a change in hue before and after irradiation was measured.

Solvent resistance: Nonwoven fabric impregnated with acetone was pressed against the surface of the obtained lens for 10 seconds. In a case where a trace of swelling was not found on the surface of the lens, this was evaluated as "B" (with solvent resistance), and in a case where a trace of swelling was found on the surface of the lens, this was evaluated as "C" (without solvent resistance).

Example 1

10.91 parts by weight of poly(propylene glycol)bis(2-aminopropyl ether) (Jeffamine D-2000, manufactured by HUNTSMAN Corporation) having a weight-average molecular weight of 2000 was added dropwise to 50.31 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 18.26 parts by weight of bis(2-mercaptoethyl)sulfide and 20.52 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.58, the striae was not found, the refractive index (ne) was 1.598, the Abbe number (ve) was 40, the Tg was 92° C., the specific gravity was 1.256, and the light fastness ΔYI was 2.0. In the impact resistant test, breakage did not occur with 530 g of a steel ball. Further, swelling due to an acetone solvent was not observed, and the solvent resistance was excellent. The results are listed in Table-1.

Example 2

10.99 parts by weight of poly(propylene glycol)bis(2-aminopropyl ether) (Jeffamine D-2000, manufactured by HUNTSMAN Corporation) having a weight-average molecular weight of 2000 was added dropwise to 50.77 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 25.81 parts by weight of bis(2-mercaptoethyl)sulfide and 12.43 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.596, the Abbe number (ve) was 40, the Tg was 88° C., the specific gravity was 1.251, and the light fastness ΔYI was 1.5. In the impact resistant test, breakage did not occur with 530 g of a steel ball. Further, swelling due to an acetone solvent was not observed, and the solvent resistance was excellent. The results are listed in Table-1.

Example 3

9.62 parts by weight of poly(propylene glycol)bis(2-aminopropyl ether) (Jeffamine D-2000, manufactured by HUNTSMAN Corporation) having a weight-average molecular weight of 2000 was added dropwise to 51.46 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 26.27 parts by weight of bis(2-mercaptoethyl)sulfide and 12.65 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.56, the striae was not found, the refractive index (ne) was 1.599, the Abbe number (ve) was 40, the Tg was 89° C., the specific gravity was 1.262, and the light fastness ΔYI was 1.6. In the impact resistant test, breakage did not occur with 530 g of a steel ball.

Further, swelling due to an acetone solvent was not observed, and the solvent resistance was excellent. The results are listed in Table-1.

Example 4

13.19 parts by weight of poly(propylene glycol)bis(2-aminopropyl ether) (Jeffamine D-2000, manufactured by HUNTSMAN Corporation) having a weight-average molecular weight of 2000 was added dropwise to 48.70 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 29.74 parts by weight of bis(2-mercaptoethyl)sulfide and 8.37 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.59, the striae was not found, the refractive index (ne) was 1.596, the Abbe number (ve) was 40, the Tg was 84° C., the specific gravity was 1.261, and the light fastness ΔYI was 1.6. In the impact resistant test, breakage did not occur with 530 g of a steel ball. Further, swelling due to an acetone solvent was not observed, and the solvent resistance was excellent. The results are listed in Table-1.

Example 5

9.63 parts by weight of poly(propylene glycol)bis(2-aminopropyl ether) (Jeffamine D-2000, manufactured by HUNTSMAN Corporation) having a weight-average molecular weight of 2000 was added dropwise to 51.67 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 30.21 parts by weight of bis(2-mercaptoethyl)sulfide and 8.49 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.598, the Abbe number (ve) was 40, the Tg was 88° C., the specific gravity was 1.264, and the light fastness ΔYI was 1.2. In the impact resistant test, breakage did not occur with 530 g of a steel ball. Further, swelling due to an acetone solvent was not observed, and the solvent resistance was excellent. The results are listed in Table-1.

Example 6

13.71 parts by weight of poly(propylene glycol)bis(2-aminopropyl ether) (Jeffamine D-2000, manufactured by HUNTSMAN Corporation) having a weight-average molecular weight of 2000 was added dropwise to 48.94 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 17.59 parts by weight of bis(2-mercaptoethyl)sulfide and 19.76 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.58, the striae was not found, the refractive index (ne) was 1.592, the Abbe number (ve) was 41, the Tg was 91° C., the specific gravity was 1.254, and the light fastness ΔYI was 1.7. In the impact resistant test, breakage did not occur with 530 g of a steel ball. Further, swelling due to an acetone solvent was not observed, and the solvent resistance was excellent. The results are listed in Table-1.

Example 7

21.97 parts by weight of poly(propylene glycol)bis(2-aminopropyl ether) (Jeffamine D-2000, manufactured by HUNTSMAN Corporation) having a weight-average molecular weight of 2000 was added dropwise to 45.25 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 25.59 parts by weight of bis(2-mercaptoethyl)sulfide and 7.19 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.59, the striae was not found, the refractive index (ne) was 1.597, the Abbe number (ve) was 42, the Tg was 76° C., the specific gravity was 1.227, and the light fastness ΔYI was 2.1. In the impact resistant test, breakage did not occur with 530 g of a steel ball. Further, swelling due to an acetone solvent was not observed, and the solvent resistance was excellent. The results are listed in Table-1.

Example 8

10.35 parts by weight of poly(propylene glycol)bis(2-aminopropyl ether) (Jeffamine D-2000, manufactured by HUNTSMAN Corporation) having a weight-average molecular weight of 2000 was added dropwise to 47.01 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 23.46 parts by weight of 2,5-bis(mercaptomethyl)-1,4-dithiane and 19.18 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.604, the Abbe number (ve) was 40, the Tg was 110° C., the specific gravity was 1.280, and the light fastness ΔYI was 2.1. In the impact resistant test, breakage did not occur with 530 g of a steel ball. Further, swelling due to an acetone solvent was not observed, and the solvent resistance was excellent. The results are listed in Table-1.

Example 9

10.22 parts by weight of poly(propylene glycol)bis(2-aminopropyl ether) (Jeffamine D-2000, manufactured by HUNTSMAN Corporation) having a weight-average molecular weight of 2000 was added dropwise to 46.20 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 32.28 parts by weight of 2,5-bis(mercaptomethyl)-1,4-dithiane and 11.30 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.56, the striae was not found, the refractive index (ne) was 1.604, the Abbe number (ve) was 40, the Tg was 113° C., the specific gravity was 1.283, and the light fastness ΔYI was 2.1. In the impact resistant test, breakage did not occur with 530 g of a steel ball. Further, swelling due to an acetone solvent was not observed, and the solvent resistance was excellent. The results are listed in Table-1.

Example 10

14.22 parts by weight of poly(propylene glycol)bis(2-aminopropyl ether) (Jeffamine D-2000, manufactured by HUNTSMAN Corporation) having a weight-average molecular weight of 2000 was added dropwise to 45.24 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 22.31 parts by weight of 2,5-bis(mercaptomethyl)-1,4-dithiane and 18.23 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.58, the striae was not found, the refractive index (ne) was 1.596, the Abbe number (ve) was 40, the Tg was 106° C., the specific gravity was 1.268, and the light fastness ΔYI was 2.1. In the impact resistant test, breakage did not occur with 530 g of a steel ball. Further, swelling due to an acetone solvent was not observed, and the solvent resistance was excellent. The results are listed in Table-1.

Example 11

14.02 parts by weight of poly(propylene glycol)bis(2-aminopropyl ether) (Jeffamine D-2000, manufactured by HUNTSMAN Corporation) having a weight-average molecular weight of 2000 was added dropwise to 44.50 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 30.72 parts by weight of 2,5-bis(mercaptomethyl)-1,4-dithiane and 10.76 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.58, the striae was not found, the refractive index (ne) was 1.598, the Abbe number (ve) was 40, the Tg was 110° C., the specific gravity was 1.271, and the light fastness ΔYI was 2.1. In the impact resistant test, breakage did not occur with 530 g of a steel ball. Further, swelling due to an acetone solvent was not observed, and the solvent resistance was excellent. The results are listed in Table-1.

Example 12

10.93 parts by weight of poly(propylene glycol)bis(2-aminopropyl ether) (Jeffamine D-2000, manufactured by HUNTSMAN Corporation) having a weight-average molecular weight of 2000 was added dropwise to 50.44 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 29.29 parts by weight of bis(2-mercaptoethyl)sulfide and 9.34 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.54, the striae was not found, the refractive index (ne) was 1.597, the Abbe number (ve) was 40, the Tg was 86° C., the specific gravity was 1.256, and the light fastness ΔYI was 1.5. In the impact resistant test, breakage did not occur with 530 g of a steel ball. Further, swelling due to an acetone solvent was not observed, and the solvent resistance was excellent. The results are listed in Table-1.

Example 13

11.35 parts by weight of poly(propylene glycol)bis(2-aminopropyl ether) (Jeffamine D-2000, manufactured by HUNTSMAN Corporation) having a weight-average molecular weight of 2000 was added dropwise to 49.51 parts by weight of 1,3-bis(isocyanatomethyl)cyclohexane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 30.56 parts by weight of bis(2-mercaptoethyl)sulfide and 8.58 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.591, the Abbe number (ve) was 40, the Tg was 75° C., the specific gravity was 1.242, and the light fastness ΔYI was 2.0. In the impact resistant test, breakage did not occur with 530 g of a steel ball. Further, swelling due to an acetone solvent was not observed, and the solvent resistance was excellent. The results are listed in Table-1.

Example 14

16.52 parts by weight of poly(propylene glycol)bis(2-aminopropyl ether) (Jeffamine D-400, manufactured by HUNTSMAN Corporation) having a weight-average molecular weight of 400 was added dropwise to 51.12 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 25.26 parts by weight of bis(2-mercaptoethyl)sulfide and 7.10 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.52, the striae was not found, the refractive index (ne) was 1.606, the Abbe number (ve) was 37, the Tg was 79° C., the specific gravity was 1.238, and the light fastness ΔYI was 2.0. In the impact resistant test, breakage did not occur with 530 g of a steel ball. Further, swelling due to an acetone solvent was not observed, and the solvent resistance was excellent. The results are listed in Table-1.

Example 15

10.93 parts by weight of poly(propylene glycol)bis(2-aminopropyl ether) (Jeffamine D-2000, manufactured by HUNTSMAN Corporation) having a weight-average molecular weight of 2000 was added dropwise to a mixed solution of 47.85 parts by weight of a mixture of 2,5-bis(isocyanatomethyl)bicyclo[2.2.1]heptane and 2,6-bis(isocyanatomethyl)bicyclo[2.2.1]heptane and 2.40 parts by weight of 1,3-bis(isocyanatomethyl)cyclohexane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 18.28 parts by weight of bis(2-mercaptoethyl)sulfide and 20.54 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.56, the striae was not found, the refractive index (ne) was 1.597, the Abbe number (ve) was 40, the Tg was 91° C., the specific gravity was 1.255, and the light fastness $\Delta YI$ was 2.0. In the impact resistant test, breakage did not occur with 530 g of a steel ball. Further, swelling due to an acetone solvent was not observed, and the solvent resistance was excellent. The results are listed in Table-1.

Example 16

5.78 parts by weight of poly(propylene glycol)bis(2-aminopropyl ether) (Jeffamine D-2000, manufactured by HUNTSMAN Corporation) having a weight-average molecular weight of 2000 and 2.63 parts by weight of poly(propylene glycol)bis(2-aminopropyl ether) (Jeffamine D-400, manufactured by HUNTSMAN Corporation) having a weight-average molecular weight of 400 were added dropwise to 51.72 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 18.77 parts by weight of bis(2-mercaptoethyl)sulfide and 21.10 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.54, the striae was not found, the refractive index (ne) was 1.598, the Abbe number (ve) was 40, the Tg was 94° C., the specific gravity was 1.253, and the light fastness $\Delta YI$ was 1.6. In the impact resistant test, breakage did not occur with 530 g of a steel ball. Further, swelling due to an acetone solvent was not observed, and the solvent resistance was excellent. The results are listed in Table-1.

Example 17

7.47 parts by weight of poly(propylene glycol)bis(2-aminopropyl ether) (Jeffamine D-2000, manufactured by HUNTSMAN Corporation) having a weight-average molecular weight of 2000 and 3.39 parts by weight of poly(propylene glycol)bis(2-aminopropyl ether) (Jeffamine D-400, manufactured by HUNTSMAN Corporation) having a weight-average molecular weight of 400 were added dropwise to 50.00 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 18.16 parts by weight of bis(2-mercaptoethyl)sulfide and 20.98 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.53, the striae was not found, the refractive index (ne) was 1.598, the Abbe number (ve) was 40, the Tg was 93° C., the specific gravity was 1.256, and the light fastness $\Delta YI$ was 1.6. In the impact resistant test, breakage did not occur with a 530 g of a steel ball. Further, swelling due to an acetone solvent was not observed, and the solvent resistance was excellent. The results are listed in Table-1.

Example 18

5.82 parts by weight of poly(propylene glycol)bis(2-aminopropyl ether) (Jeffamine D-2000, manufactured by HUNTSMAN Corporation) having a weight-average molecular weight of 2000 and 2.65 parts by weight of poly(propylene glycol)bis(2-aminopropyl ether) (Jeffamine D-400, manufactured by HUNTSMAN Corporation) having a weight-average molecular weight of 400 were added dropwise to 52.21 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 26.54 parts by weight of bis(2-mercaptoethyl)sulfide and 12.78 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.52, the striae was not found, the refractive index (ne) was 1.597, the Abbe number (ve) was 40, the Tg was 90° C., the specific gravity was 1.255, and the light fastness ΔYI was 1.5. In the impact resistant test, breakage did not occur with 530 g of a steel ball. Further, swelling due to an acetone solvent was not observed, and the solvent resistance was excellent. The results are listed in Table-1.

Example 19

7.56 parts by weight of poly(propylene glycol)bis(2-aminopropyl ether) (Jeffamine D-2000, manufactured by HUNTSMAN Corporation) having a weight-average molecular weight of 2000 and 3.43 parts by weight of poly(propylene glycol)bis(2-aminopropyl ether) (Jeffamine D-400, manufactured by HUNTSMAN Corporation) having a weight-average molecular weight of 400 were added dropwise to 50.77 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 25.81 parts by weight of bis(2-mercaptoethyl)sulfide and 12.43 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.52, the striae was not found, the refractive index (ne) was 1.597, the Abbe number (ve) was 40, the Tg was 89° C., the specific gravity was 1.256, and the light fastness ΔYI was 1.5. In the impact resistant test, breakage did not occur with 530 g of a steel ball. Further, swelling due to an acetone solvent was not observed, and the solvent resistance was excellent. The results are listed in Table-1.

Example 20

10.91 parts by weight of poly(propylene glycol)bis(2-aminopropyl ether) (Jeffamine D-2000, manufactured by HUNTSMAN Corporation) having a weight-average molecular weight of 2000 was added dropwise to 50.31 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride, 1.50 parts by weight of an ultraviolet absorbing agent (BIOSORB 583 (trade name), manufactured by KYODO CHEMICAL CO., LTD.), and 0.60 parts by weight of the internal release agent (Internal Release Agent for MR (trade name), manufactured by Mitsui Chemicals, Inc.) were mixed with and dissolved in the solution so as to obtain a uniform solution, and 18.26 parts by weight of bis(2-mercaptoethyl)sulfide and 20.52 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.598, the Abbe number (ve) was 40, the Tg was 90° C., the specific gravity was 1.256, and the light fastness ΔYI was 0.5. In the impact resistant test, breakage did not occur with 530 g of a steel ball. Further, swelling due to an acetone solvent was not observed, and the solvent resistance was excellent. The results are listed in Table-1.

Example 21

10.91 parts by weight of poly(propylene glycol)bis(2-aminopropyl ether) (Jeffamine D-2000, manufactured by HUNTSMAN Corporation) having a weight-average molecular weight of 2000 was added dropwise to 50.31 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride, 1.00 part by weight of an ultraviolet absorbing agent (TINUVIN 326 (trade name), manufactured by BASF SE), and 0.60 parts by weight of the internal release agent (Internal Release Agent for MR (trade name), manufactured by Mitsui Chemicals, Inc.) were mixed with and dissolved in the solution so as to obtain a uniform solution, and 18.26 parts by weight of bis(2-mercaptoethyl)sulfide and 20.52 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.598, the Abbe number (ve) was 40, the Tg was 91° C., the specific gravity was 1.256, and the light fastness ΔYI was 0.3. In the impact resistant test, breakage did not occur with 530 g of a steel ball. Further, swelling due to an acetone solvent was not observed, and the solvent resistance was excellent. The results are listed in Table-1.

Comparative Example 1

0.15 parts by weight of dibutyl tin dichloride and 0.60 parts by weight of the internal release agent (Internal Release Agent for MR (trade name), manufactured by Mitsui Chemicals, Inc.) were mixed with and dissolved in 56.58 parts by weight of a mixture of 2,5-bis(isocyanatomethyl) bicyclo[2.2.1]heptane and 2,6-bis(isocyanatomethyl)bicyclo [2.2.1]heptane so as to obtain a uniform solution, and 33.89 parts by weight of bis(2-mercaptoethyl)sulfide and 9.53 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.51, the striae was not found, the refractive index (ne) was 1.615, the Abbe number (ve) was 38, the Tg was 94° C., the specific gravity was 1.289, and the light fastness ΔYI was 8.0. In the impact resistant test, breakage occurred with 112 g of a steel ball. Further, swelling due to an acetone solvent was not observed, and the solvent resistance was excellent. The results are listed in Table-1.

Comparative Example 2

0.15 parts by weight of dibutyl tin dichloride and 0.60 parts by weight of the internal release agent (Internal Release Agent for MR (trade name), manufactured by Mitsui Chemicals, Inc.) were mixed with and dissolved in 53.58 parts by weight of a mixture of 2,5-bis(isocyanatomethyl) bicyclo[2.2.1]heptane and 2,6-bis(isocyanatomethyl)bicyclo [2.2.1]heptane so as to obtain a uniform solution, and 32.10 parts by weight of bis(2-mercaptoethyl)sulfide and 14.32 parts by weight of trimethylolpropane tris(3-mercaptopropionate) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.51, the striae was not found, the refractive index (ne) was 1.599, the Abbe number (ve) was 40, the Tg was 90° C., the specific gravity was 1.287 and the light fastness ΔYI was 6.3. In the impact resistant test, breakage occurred with 112 g of a steel ball. Further, swelling due to an acetone solvent was not observed, and the solvent resistance was excellent. The results are listed in Table-1.

Comparative Example 3

16.42 parts by weight of poly(propylene glycol)bis(2-aminopropyl ether) (Jeffamine D-2000, manufactured by HUNTSMAN Corporation) having a weight-average molecular weight of 2000 was added dropwise to 48.70 parts by weight of a mixture of 2,5-bis(isocyanatomethyl)bicyclo [2.2.1]heptane and 2,6-bis(isocyanatomethyl)bicyclo[2.2.1] heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 34.88 parts by weight of bis(2-mercaptoethyl) sulfide was further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.58, the striae was not found, the refractive index (ne) was 1.585, the Abbe number (ve) was 41, the Tg was 74° C., the specific gravity was 1.242, and the light fastness ΔYI was 2.3. In the impact resistant test, breakage did not occur with 530 g of a steel ball. However, swelling due to an acetone solvent was observed, and the solvent resistance was poor. The results are listed in Table-1.

Comparative Example 4

11.48 parts by weight of m-xylylenediamine was added dropwise to 57.42 parts by weight of a mixture of 2,5-bis (isocyanatomethyl)bicyclo[2.2.1]heptane and 2,6-bis(isocyanatomethyl)bicyclo[2.2.1]heptane. As the result, a polymer-like insoluble material was precipitated with rapid heat generation. Therefore, it was impossible to perform the subsequent processes. The results are listed in Table-1.

Comparative Example 5

14.12 parts by weight of poly(propylene glycol)bis(2-aminopropyl ether) (Jeffamine D-2000, manufactured by HUNTSMAN Corporation) having a weight-average molecular weight of 2000 was added dropwise to 47.37 parts by weight of a mixture of 2,5-bis(isocyanatomethyl)bicyclo [2.2.1]heptane and 2,6-bis(isocyanatomethyl)bicyclo[2.2.1] heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 38.51 parts by weight of 4-mercaptomethyl-1,8-dimercapto-3,6-dithiaoctane were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.59, the striae was not found, the refractive index (ne) was 1.595, the Abbe number (ve) was 40, the Tg was 93° C., the specific gravity was 1.260, and the light fastness ΔYI was 2.1. In the impact resistant test, breakage occurred with 174 g of a steel ball. Further, swelling due to an acetone solvent was not observed, and the solvent resistance was excellent. The results are listed in Table-1.

Example 22

7.00 parts by weight of poly(propylene glycol)bis(2-aminopropyl ether) (Jeffamine D-2000, manufactured by HUNTSMAN Corporation) having a weight-average molecular weight of 2000 was added dropwise to 53.85 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 15.55 parts by weight of bis(2-mercaptoethyl)sulfide, 16.60 parts by weight of 4-mercaptomethyl-1,8-dimercapto-3,6-dithiaoctane, and 7.00 parts by weight of 1,4-cyclohexane dimethanol (manufactured by Tokyo Chemical Industry Co., Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.50, the striae was not found, the refractive index (ne) was 1.586, the Abbe number (ve) was 42, the Tg was 96° C., the specific gravity was 1.252, and the light fastness ΔYI was 1.2. In the impact resistant test, breakage did not occur with 530 g of a steel ball. Further, swelling due to an acetone solvent was not observed, and the solvent resistance was excellent. The results are listed in Table-2.

Example 23

7.00 parts by weight of poly(propylene glycol)bis(2-aminopropyl ether) (Jeffamine D-2000, manufactured by HUNTSMAN Corporation) having a weight-average molecular weight of 2000 was added dropwise to 52.65 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 16.10 parts by weight of bis(2-mercaptoethyl)sulfide, 17.25 parts by weight of 4-mercaptomethyl-1,8-dimercapto-3,6-dithiaoctane, and 7.00 parts by weight of tricyclodecane dimethanol (manufactured by Tokyo Chemical Industry Co., Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.50, the striae was not found, the refractive index (ne) was 1.591, the Abbe number (ve) was 41, the Tg was 97° C., the specific gravity was 1.258, and the light fastness ΔYI was 1.2. In the impact resistant test, breakage did not occur with 530 g of a steel ball. Further, swelling due to an acetone solvent was not observed, and the solvent resistance was excellent. The results are listed in Table-2.

Example 24

7.00 parts by weight of poly(propylene glycol)bis(2-aminopropyl ether) (Jeffamine D-2000, manufactured by HUNTSMAN Corporation) having a weight-average molecular weight of 2000 was added dropwise to 53.48 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 17.65 parts by weight of bis(2-mercaptoethyl)sulfide, 18.87 parts by weight of 4-mercaptomethyl-1,8-dimercapto-3,6-dithiaoctane, and 3.00 parts by weight of 1,4-cyclohexane dimethanol (manufactured by Tokyo Chemical Industry Co., Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.57, the striae was not found, the refractive index (ne) was 1.594, the Abbe number (ve) was 41, the Tg was 90° C., the specific gravity was 1.253, and the light fastness ΔYI was 1.5. In the impact resistant test, breakage did not occur with 530 g of a steel ball. Further, swelling due to an acetone solvent was not observed, and the solvent resistance was excellent. The results are listed in Table-2.

Example 25

7.00 parts by weight of poly(propylene glycol)bis(2-aminopropyl ether) (Jeffamine D-2000, manufactured by HUNTSMAN Corporation) having a weight-average molecular weight of 2000 was added dropwise to 53.79 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 14.12 parts by weight of bis(2-mercaptoethyl)sulfide, 15.09 parts by weight of 4-mercaptomethyl-1,8-dimercapto-3,6-dithiaoctane, and 10.00 parts by weight of 1,4-cyclohexane dimethanol (manufactured by Tokyo Chemical Industry Co., Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.32, the striae was not found, the refractive index (ne) was 1.581, the Abbe number (ve) was 42, the Tg was 103° C., the specific gravity was 1.250, and the light fastness ΔYI was 1.2. In the impact resistant test, breakage did not occur with 530 g of a steel ball. Further, swelling due to an acetone solvent was not observed, and the solvent resistance was excellent. The results are listed in Table-2.

Example 26

7.00 parts by weight of poly(propylene glycol)bis(2-aminopropyl ether) (Jeffamine D-2000, manufactured by HUNTSMAN Corporation) having a weight-average molecular weight of 2000 was added dropwise to 52.98 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 17.89 parts by weight of bis(2-mercaptoethyl)sulfide, 19.13 parts by weight of 4-mercaptomethyl-1,8-dimercapto-3,6-dithiaoctane, and 3.00 parts by weight of tricyclodecane dimethanol (manufactured by Tokyo Chemical Industry Co., Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.56, the striae was not found, the refractive index (ne) was 1.598, the Abbe number (ve) was 40, the Tg was 91° C., the specific gravity was 1.253, and the light fastness ΔYI was 1.3. In the impact resistant test, breakage did not occur with 530 g of a steel ball. Further, swelling due to an acetone solvent was not observed, and the solvent resistance was excellent. The results are listed in Table-2.

Example 27

7.00 parts by weight of poly(propylene glycol)bis(2-aminopropyl ether) (Jeffamine D-2000, manufactured by HUNTSMAN Corporation) having a weight-average molecular weight of 2000 was added dropwise to 52.15 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 14.91 parts by weight of bis(2-mercaptoethyl)sulfide, 15.94 parts by weight of 4-mercaptomethyl-1,8-dimercapto-3,6-dithiaoctane, and 10.00 parts by weight of tricyclodecane dimethanol (manufactured by Tokyo Chemical Industry Co., Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.31, the striae was not found, the refractive index (ne) was 1.588, the Abbe number (ve) was 41, the Tg was 105° C., the specific gravity was 1.251, and the light fastness ΔYI was 1.2. In the impact resistant test, breakage did not occur with 530 g of a steel ball. Further, swelling due to an acetone solvent was not observed, and the solvent resistance was excellent. The results are listed in Table-2.

Example 28

7.00 parts by weight of poly(propylene glycol)bis(2-aminopropyl ether) (Jeffamine D-2000, manufactured by HUNTSMAN Corporation) having a weight-average molecular weight of 2000 was added dropwise to 57.93 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 13.57 parts by weight of bis(2-mercaptoethyl)sulfide 14.50 parts by weight of 4-mercaptomethyl-1,8-dimercapto-3,6-dithiaoctane, and 7.00 parts by weight of propylene glycol (manufactured by Wako Pure Chemical Industries, Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.61, distortion in the lens was not found by visual observation, the refractive index (ne) was 1.576, the Abbe number (ve) was 43, the Tg was 95° C., the specific gravity was 1.251, and the light fastness ΔYI was 1.3. In the impact resistant test, breakage did not occur with 530 g of a steel ball. Further, swelling due to an acetone solvent was not observed, and the solvent resistance was excellent. The results are listed in Table-2.

Example 29

7.00 parts by weight of poly(propylene glycol)bis(2-aminopropyl ether) (Jeffamine D-2000, manufactured by HUNTSMAN Corporation) having a weight-average molecular weight of 2000 was added dropwise to 54.22 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 15.36 parts by weight of bis(2-mercaptoethyl)sulfide, 16.42 parts by weight of 4-mercaptomethyl-1,8-dimercapto-3,6-dithiaoctane, and 7.00 parts by weight of dipropylene glycol (manufactured by Wako Pure Chemical Industries, Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.69, the striae was not found, the refractive index (ne) was 1.583, the Abbe number (ve) was 42, the Tg was 90° C., the specific gravity was 1.253, and the light fastness ΔYI was 1.5. In the impact resistant test, breakage did not occur with 530 g of a steel ball. Further, swelling due to an acetone solvent was not observed, and the solvent resistance was excellent. The results are listed in Table-2.

Example 30

7.00 parts by weight of poly(propylene glycol)bis(2-aminopropyl ether) (Jeffamine D-2000, manufactured by HUNTSMAN Corporation) having a weight-average molecular weight of 2000 was added dropwise to 52.73 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 16.08 parts by weight of bis(2-mercaptoethyl)sulfide, 17.19 parts by weight of 4-mercaptomethyl-1,8-dimercapto-3,6-dithiaoctane, and 7.00 parts by weight of tripropylene glycol (manufactured by Wako Pure Chemical Industries, Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.69, the striae was not found, the refractive index (ne) was 1.586, the Abbe number (ve) was 41, the Tg was 86° C., the specific gravity was 1.255, and the light fastness ΔYI was 1.6. In the impact resistant test, breakage did not occur with 530 g of a steel ball. Further, swelling due to an acetone solvent was not observed, and the solvent resistance was excellent. The results are listed in Table-2.

Example 31

7.00 parts by weight of poly(propylene glycol)bis(2-aminopropyl ether) (Jeffamine D-2000, manufactured by HUNTSMAN Corporation) having a weight-average molecular weight of 2000 was added dropwise to 51.20 parts by weight of a mixture of 2,5-bis(isocyanatomethyl)bicyclo[2.2.1]heptane and 2,6-bis(isocyanatomethyl)bicyclo[2.2.1]heptane, and the resultant was allowed to react at 20° C. for 1 hour. 0.15 parts by weight of dibutyl tin dichloride and 0.60 parts by weight of the internal release agent (Internal Release Agent for MR (trade name), manufactured by Mitsui Chemicals, Inc.) were mixed with and dissolved in the solution so as to obtain a uniform solution, and 20.30 parts by weight of bis(2-mercaptoethyl)sulfide, 14.50 parts by weight of 4-mercaptomethyl-1,8-dimercapto-3,6-dithiaoctane, and 7.00 parts by weight of polypropylene glycol (diol type, molecular weight of approximately 400, manufactured by Wako Pure Chemical Industries, Ltd.) were further mixed with and dissolved in the resulting solution so as to obtain a uniform solution. After deforming was performed at 400 Pa and the solution was injected into a forming mold. The mold was placed in a polymerization oven and gradually heated to a temperature of 25° C. to 120° C. for 24 hours for polymerization. After the polymerization was completed, the mold was taken out from the oven, and release work from the forming mold was performed. The release properties were excellent, and peeling of the mold was not found. The obtained molded body was further subjected to an annealing treatment at 120° C. for 1 hour. The obtained molded body was transparent, the haze value was 0.69, the striae was not found, the refractive index (ne) was 1.589, the Abbe number (ve) was 41, the Tg was 81° C., the specific gravity was 1.254, and the light fastness ΔYI was 1.6. In the impact resistant test, breakage did not occur with 530 g of a steel ball. Further, swelling due to an acetone solvent was not observed, and the solvent resistance was excellent. The results are listed in Table-2.

TABLE 1

|  |  | amine 1 (pbw) | amine 2 (pbw) | Isocyanate 1 (pbw) | Isocyanate 2 (pbw) | Thiol 1 (pbw) | Thiol 2 (pbw) | *1 NH2/NCO [mole ratio] | *2 Thiol 1/Thiol 2 [mole ratio] |
|---|---|---|---|---|---|---|---|---|---|
| Example | 1 | A1 (10.91) | — | I1 (50.31) | — | T1 (18.26) | T2 (20.52) | 0.022 | 1.50 |
|  | 2 | A1 (10.99) | — | I1 (50.77) | — | T1 (25.81) | T2 (12.43) | 0.022 | 3.50 |
|  | 3 | A1 (9.62) | — | I1 (51.46) | — | T1 (26.27) | T2 (12.65) | 0.019 | 3.50 |
|  | 4 | A1 (13.19) | — | I1 (48.70) | — | T1 (29.74) | T2 (8.37) | 0.028 | 6.00 |
|  | 5 | A1 (9.63) | — | I1 (51.67) | — | T1 (30.21) | T2 (8.49) | 0.019 | 6.00 |
|  | 6 | A1 (13.71) | — | I1 (48.94) | — | T1 (17.59) | T2 (19.76) | 0.029 | 1.50 |
|  | 7 | A1 (21.97) | — | I1 (45.25) | — | T1 (25.59) | T2 (7.19) | 0.050 | 6.00 |
|  | 8 | A1 (10.35) | — | I1 (47.01) | — | T3 (23.46) | T2 (19.18) | 0.023 | 1.50 |
|  | 9 | A1 (10.22) | — | I1 (46.20) | — | T3 (32.28) | T2 (11.30) | 0.023 | 3.50 |
|  | 10 | A1 (14.22) | — | I1 (45.24) | — | T3 (22.31) | T2 (18.23) | 0.032 | 1.50 |
|  | 11 | A1 (14.02) | — | I1 (44.50) | — | T3 (30.72) | T2 (10.76) | 0.033 | 3.50 |
|  | 12 | A1 (10.93) | — | I1 (50.44) | — | T1 (29.29) | T4 (9.34) | 0.022 | 7.45 |
|  | 13 | A1 (11.35) | — | — | I2 (49.51) | T1 (30.56) | T2 (8.58) | 0.022 | 6.01 |
|  | 14 | — | A2 (16.52) | I1 (51.12) | — | T1 (25.26) | T2 (7.10) | 0.167 | 6.00 |
|  | 15 | A1 (10.93) | — | I1 (47.85) | I2 (2.40) | T1 (18.28) | T2 (20.54) | 0.022 | 1.50 |
|  | 16 | A1 (5.78) | A2 (2.63) | I1 (51.72) | — | T1 (18.77) | T2 (21.10) | 0.038 | 1.50 |
|  | 17 | A1 (7.47) | A2 (3.39) | I1 (50.00) | — | T1 (18.16) | T2 (20.98) | 0.050 | 1.46 |
|  | 18 | A1 (5.82) | A2 (2.65) | I1 (52.21) | — | T1 (26.54) | T2 (12.78) | 0.038 | 3.50 |
|  | 19 | A1 (7.56) | A2 (3.43) | I1 (50.77) | — | T1 (25.81) | T2 (12.43) | 0.050 | 3.50 |
|  | 20 | A1 (10.91) | — | I1 (50.31) | — | T1 (18.26) | T2 (20.52) | 0.017 | 1.50 |
|  | 21 | A1 (10.91) | — | I1 (50.31) | — | T1 (18.26) | T2 (20.52) | 0.017 | 1.50 |
| Comparative Example | 1 | — | — | I1 (56.58) | — | T1 (33.89) | T2 (9.53) | — | 6.00 |
|  | 2 | — | — | I1 (53.58) | — | T1 (32.10) | T5 (14.32) | — | 5.78 |
|  | 3 | A1 (16.42) | — | I1 (48.70) | — | T1 (34.88) | — | 0.067 | — |
|  | 4 | — | A3 (11.48) | I1 (57.42) | — | — | — | 0.232 | — |
|  | 5 | A1 (14.12) | — | I1 (47.37) | — | — | T2 (38.51) | 0.031 | 0 |

|  |  | Optical properties | | | | Heat resistance [° C.] | Specific gravity of resin [20° C.] | Impact resistance | Light fastness [QUV ΔYI] | Solvent resistance [acetone] |
|---|---|---|---|---|---|---|---|---|---|---|
|  |  | Transparency | HAZE | Striae | Refractive index [ne] | Abbe number (ve) | | | | | |
| Example | 1 | B | 0.58 | A | 1.598 | 40 | 92 | 1.256 | >530 g | 2.0 | B |
|  | 2 | B | 0.57 | A | 1.596 | 40 | 88 | 1.251 | >530 g | 1.5 | B |
|  | 3 | B | 0.56 | A | 1.599 | 40 | 89 | 1.262 | >530 g | 1.6 | B |
|  | 4 | B | 0.59 | A | 1.596 | 40 | 84 | 1.261 | >530 g | 1.6 | B |
|  | 5 | B | 0.57 | A | 1.598 | 40 | 88 | 1.264 | >530 g | 1.2 | B |
|  | 6 | B | 0.58 | A | 1.592 | 41 | 91 | 1.254 | >530 g | 1.7 | B |
|  | 7 | B | 0.59 | A | 1.597 | 42 | 76 | 1.227 | >530 g | 2.1 | B |
|  | 8 | B | 0.57 | A | 1.604 | 40 | 110 | 1.280 | >530 g | 2.1 | B |
|  | 9 | B | 0.56 | A | 1.604 | 40 | 113 | 1.283 | >530 g | 2.1 | B |
|  | 10 | B | 0.58 | A | 1.596 | 40 | 106 | 1.268 | >530 g | 2.1 | B |
|  | 11 | B | 0.58 | A | 1.598 | 40 | 110 | 1.271 | >530 g | 2.1 | B |
|  | 12 | B | 0.54 | A | 1.597 | 40 | 86 | 1.256 | >530 g | 1.5 | B |
|  | 13 | B | 0.57 | A | 1.591 | 40 | 75 | 1.242 | >530 g | 2.0 | B |
|  | 14 | B | 0.52 | A | 1.606 | 37 | 79 | 1.238 | >530 g | 2.0 | B |
|  | 15 | B | 0.56 | A | 1.597 | 40 | 91 | 1.255 | >530 g | 2.0 | B |
|  | 16 | B | 0.54 | A | 1.598 | 40 | 94 | 1.253 | >530 g | 1.6 | B |
|  | 17 | B | 0.53 | A | 1.598 | 40 | 93 | 1.256 | >530 g | 1.6 | B |

TABLE 1-continued

|  |  |  |  |  |  |  |  |  |  |  |
|---|---|---|---|---|---|---|---|---|---|---|
|  | 18 | B | 0.52 | A | 1.597 | 40 | 90 | 1.255 | >530 g | 1.5 | B |
|  | 19 | B | 0.52 | A | 1.597 | 40 | 89 | 1.256 | >530 g | 1.5 | B |
|  | 20 | B | 0.57 | A | 1.598 | 40 | 90 | 1.256 | >530 g | 0.5 | B |
|  | 21 | B | 0.57 | A | 1.598 | 40 | 91 | 1.256 | >530 g | 0.3 | B |
| Comparative | 1 | B | 0.51 | A | 1.615 | 38 | 94 | 1.289 | 112 g | 8.0 | B |
| Example | 2 | B | 0.51 | A | 1.599 | 40 | 90 | 1.287 | 112 g | 6.3 | B |
|  | 3 | B | 0.58 | A | 1.585 | 41 | 74 | 1.242 | >530 g | 2.3 | C |
|  | 4 | A polymer-like insoluble material was precipitated with rapid heat generation. Therefore, the subsequent processes were stopped. | | | | | | | | | |
|  | 5 | B | 0.59 | A | 1.595 | 40 | 93 | 1.260 | 174 g | 2.1 | B |

TABLE 2

|  |  | amine 1 (pbw) | amine 2 (pbw) | Isocyanate 1 (pbw) | Isocyanate 2 (pbw) | Thiol 1 (pbw) | Thiol 2 (pbw) | Polyol (pbw) | *1 NH2/NCO [mole ratio] | *2 Thiol 1/Thiol 2 [mole ratio] | *3 OH/TotalSH [mole ratio] |
|---|---|---|---|---|---|---|---|---|---|---|---|
| Example | 22 | A1 (7.00) | — | I1 (53.85) | — | T1 (15.55) | T2 (16.60) | P1 (7.00) | 0.013 | 1.58 | 0.247 |
|  | 23 | A1 (7.00) | — | I1 (52.65) | — | T1 (16.10) | T2 (17.25) | P2 (7.00) | 0.013 | 1.57 | 0.175 |
|  | 24 | A1 (7.00) | — | I1 (53.48) | — | T1 (17.65) | T2 (18.87) | P1 (3.00) | 0.013 | 1.58 | 0.093 |
|  | 25 | A1 (7.00) | — | I1 (53.79) | — | T1 (14.12) | T2 (15.09) | P1 (10.00) | 0.013 | 1.58 | 0.389 |
|  | 26 | A1 (7.00) | — | I1 (52.98) | — | T1 (17.89) | T2 (19.13) | P2 (3.00) | 0.014 | 1.58 | 0.034 |
|  | 27 | A1 (7.00) | — | I1 (52.15) | — | T1 (14.91) | T2 (15.94) | P2 (10.00) | 0.014 | 1.58 | 0.135 |
|  | 28 | A1 (7.00) | — | I1 (57.93) | — | T1 (13.57) | T2 (14.50) | P3 (7.00) | 0.013 | 1.58 | 0.537 |
|  | 29 | A1 (7.00) | — | I1 (54.22) | — | T1 (15.36) | T2 (16.42) | P4 (7.00) | 0.013 | 1.58 | 0.269 |
|  | 30 | A1 (7.00) | — | I1 (52.73) | — | T1 (16.08) | T2 (17.19) | P5 (7.00) | 0.014 | 1.58 | 0.179 |
|  | 31 | A1 (7.00) | — | I1 (51.20) | — | T1 (20.30) | T2 (14.50) | P6 (7.00) | 0.014 | 2.36 | 0.081 |

|  |  | Optical properties | | | Heat resistance [° C.] | Specific gravity of resin [20° C.] | Impact resistance | Light fastness [QUV ΔYI] | Solvent resistance [acetone] |
|---|---|---|---|---|---|---|---|---|---|
|  |  | Transparency | HAZE | Striae | Refractive index [ne] | Abbe's number (ve) | | | | | |
| Example | 22 | B | 0.50 | A | 1.586 | 42 | 96 | 1.252 | >530 g | 1.2 | B |
|  | 23 | B | 0.50 | A | 1.591 | 41 | 97 | 1.258 | >530 g | 1.2 | B |
|  | 24 | B | 0.57 | A | 1.594 | 41 | 90 | 1.253 | >530 g | 1.5 | B |
|  | 25 | B | 0.32 | A | 1.581 | 42 | 103 | 1.250 | >530 g | 1.2 | B |
|  | 26 | B | 0.56 | A | 1.598 | 40 | 91 | 1.253 | >530 g | 1.3 | B |
|  | 27 | B | 0.31 | A | 1.588 | 41 | 105 | 1.251 | >530 g | 1.2 | B |
|  | 28 | B | 0.61 | B | 1.576 | 43 | 95 | 1.251 | >530 g | 1.3 | B |
|  | 29 | B | 0.69 | A | 1.583 | 42 | 90 | 1.253 | >530 g | 1.5 | B |
|  | 30 | B | 0.69 | A | 1.586 | 41 | 86 | 1.255 | >530 g | 1.6 | B |
|  | 31 | B | 0.69 | A | 1.589 | 41 | 81 | 1.254 | >530 g | 1.6 | B |

The symbols in the tables have the following meanings.
1: The ratio (a/b) of the molar number a of the amino group in the amine compound (A) to the molar number b of the iso(thio) cyanate group in the iso(thio)cyanate compound (B)
2: The ratio of the molar number of the polythiol compound (c2) to the molar number of the dithiol compound (c1) contained in the polythiol compound (C)
3: The ratio of the molar number c of the mercapto group in the polythiol compound (C) to the molar number d of the hydroxy group in the polyol compound (D)

The above-described values are theoretical values calculated by setting the purity of each compound to 100% based on the amount of each compound to be used.

(Amine Compound (A))
A1: Poly(propylene glycol)bis(2-aminopropyl ether) (Jeffamine D-2000, manufactured by HUNTSMAN Corporation) having a weight-average molecular weight of 2000
A2: Poly(propylene glycol)bis(2-aminopropyl ether) (Jeffamine D-400, manufactured by HUNTSMAN Corporation) having a weight-average molecular weight of 400
A3: m-Xylylenediamine (Iso(Thio)Cyanate Compound (B))
I1: Mixture of 2,5-bis(isocyanatomethyl)bicyclo[2.2.1]heptane and 2,6-bis(isocyanatomethyl)bicyclo[2.2.1]heptane
I2: 1,3-bis(isocyanatomethyl)cyclohexane (Polythiol Compound (C))
T1: Bis(2-mercaptoethyl)sulfide
T2: 4-Mercaptomethyl-1,8-dimercapto-3,6-dithiaoctane
T3: 2,5-Bis(mercaptomethyl)-1,4-dithiane
T4: Mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane
T5: Trimethylolpropane tris(3-mercaptopropionate)

(Polyol Compound (D))

P1: 1,4-Cyclohexane dimethanol (manufactured by Tokyo Chemical Industry Co., Ltd.)

P2: Tricyclodecane dimethanol (manufactured by Tokyo Chemical Industry Co., Ltd.)

P3: Propylene glycol (manufactured by Wako Pure Chemical Industries, Ltd.)

P4: Dipropylene glycol (manufactured by Wako Pure Chemical Industries, Ltd.)

P5: Tripropylene glycol (manufactured by Wako Pure Chemical Industries, Ltd.)

P6: Polypropylene glycol (diol type, molecular weight of approximately 400, manufactured by Wako Pure Chemical Industries, Ltd.)

The thiourethane urea formed bodies of Examples 1 to 21 respectively had a low specific gravity, excellent impact resistance and light fastness, and were excellent in balance of these characteristics compared to the thiourethane formed bodies of Comparative Examples 1 and 2.

Further, the thiourethane urea formed bodies of Examples 1 to 21 respectively had excellent solvent resistance compared to the thiourethane urea molded body (Comparative Example 3) obtained by using only a dithiol and had excellent impact resistance compared to the thiourethane urea molded body (Comparative Example 5) obtained by using only a trifunctional thiol.

Further, in a case of the combination (Comparative Example 4) of a primary aromatic amine and an isocyanate compound, a polymer-like insoluble material was precipitated with rapid heat generation, a resin molded body was not able to be obtained.

The thiourethane urea formed bodies obtained by using a polyol of Examples 22 to 31 respectively had the impact resistance equivalent to that of the thiourethane urea formed bodies of Examples 1 to 21, had excellent heat resistance and transparency, and had a high refractive index, and were excellent in balance of these characteristics.

As described above, the thiourethane urea molded body obtained from the polymerizable composition for an optical material of the present invention had a low specific gravity, excellent heat resistance, impact resistance, and light fastness, was able to suppress occurrence of optical distortion (striae), had excellent light fastness, and was excellent in balance in these characteristics.

The thiourethane urea molded body obtained from the polymerizable composition for an optical material of the present invention can be suitably used for various optical materials required to have high transparency and particularly for spectacle lenses.

This application claims the priority based on Japanese Patent Application No. 2016-208962 filed on Oct. 25, 2016, the content of which is incorporated herein by reference.

The invention claimed is:

1. A polymerizable composition for an optical material, comprising:
   at least one amine compound (A) selected from a compound (a1) represented by Formula (1) and a compound (a2) represented by Formula (2);
   at least one iso(thio)cyanate compound (B) which contains two or more iso(thio)cyanate groups; and
   a polythiol compound (C) which contains at least one dithiol compound (c1) containing two mercapto groups and at least one polythiol compound (c2) containing three or more mercapto groups:

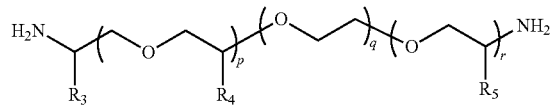

wherein in Formula (1), $R_3$ to $R_5$ each independently represent a hydrogen atom or a methyl group, p represents an integer of 0 to 100, q represents an integer of 0 to 100, r represents an integer of 1 to 100, p+r represents an integer of 1 to 100, and in a case where a plurality of $R_4$'s or $R_5$'s are present, $R_4$'s or $R_5$'s may be the same as or different from each other;

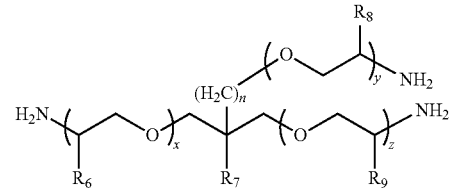

wherein in Formula (2), $R_6$, $R_8$, and $R_9$ each independently represent a hydrogen atom or a methyl group, $R_7$ represents a linear alkyl group having 1 to 20 carbon atoms, a branched alkyl group having 3 to 20 carbon atoms, or a cyclic alkyl group having 3 to 20 carbon atoms, x+y+z represents an integer of 1 to 200, n represents an integer of 0 to 10, and in a case where a plurality of $R_6$'s, $R_8$'s, or $R_9$'s are present, $R_6$'s, $R_8$'s, or $R_9$'s may be the same as or different from each other wherein a ratio (m1/m2) of a total molar number m1 of the mercapto groups in the at least one diothiol compound (c1) to a total molar number m2 of the mercapto groups in the at least one polythiol compound (c2) is in a range of 1 to 13.

2. The polymerizable composition for an optical material according to claim 1, further comprising:
   a polyol compound (D) which contains two or more hydroxy groups.

3. The polymerizable composition for an optical material according to claim 1,
   wherein a ratio (a/b) of a total molar number a of the amino groups in the at least one amine compound (A) to a total molar number b of the iso(thio)cyanate groups in the at least one iso(thio)cyanate compound (B) is in a range of 0.01 to 0.20.

4. The polymerizable composition for an optical material according to claim 1,
   wherein a weight-average molecular weight (MW) of the compound (a1) represented by Formula (1) is in a range of 200 to 4000.

5. The polymerizable composition for an optical material according to claim 1,
   wherein a weight-average molecular weight (MW) of the compound (a2) represented by Formula (2) is in a range of 400 to 5000.

6. The polymerizable composition for an optical material according to claim 1,
   wherein the at least one dithiol compound (c1) is at least one selected from the group consisting of 2,5-dimercaptomethyl-1,4-dithiane, ethylene glycol bis(3- mercaptopropionate), 4,6-bis(mercaptomethylthio)-1,3-dithiane, 2-(2,2-bis(mercaptomethylthio)ethyl)-1,3-dithietane, and bis(2-mercaptoethyl)sulfide, and the at least one polythiol compound (c2) is at least one selected from the group consisting of trimethylolpropane tris(3-mercaptopropionate), pentaerythritol tetrakis(2-mercaptoacetate), pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 1,1,3,3-tetrakis(mercaptomethylthio)propane.

7. The polymerizable composition for an optical material according to claim 1, wherein the at least one iso(thio)cyanate compound (B) is at least one selected from the group consisting of hexamethylene diisocyanate, pentamethylene diisocyanate, m-xylylene diisocyanate, isophorone diisocyanate, bis(isocyanatomethyl)cyclohexane, dicyclohexylmethane-4,4'-diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and 4,4'-diphenylmethane diisocyanate.

8. The polymerizable composition for an optical material according to claim 2, wherein the polyol compound (D) contains a diol compound (d1) containing two hydroxy groups.

9. The polymerizable composition for an optical material according to claim 8, wherein the diol compound (d1) contains at least one selected from a linear aliphatic diol compound, a branched aliphatic diol compound, a cyclic aliphatic diol compound, and an aromatic diol compound.

10. The polymerizable composition for an optical material according to claim 8, wherein the diol compound (d1) is at least one selected from the group consisting of cyclohexane dimethanol, tricyclodecane dimethanol, and polypropylene glycol.

11. A method of producing an optical material, comprising:

a step of injecting the polymerizable composition for an optical material according to claim 1 into a mold; and a step of polymerizing and curing the polymerizable composition for an optical material in the mold.

12. A method of producing a plastic polarized lens, comprising:

a step of fixing a polarizing film into a mold for casting a lens in a state in which at least one surface of the polarizing film is separated from the mold;

a step of injecting the polymerizable composition for an optical material according to claim 1 into a gap between the polarizing film and the mold; and a step of polymerizing and curing the polymerizable composition for an optical material and laminating a base material layer formed of the cured product of the polymerizable composition for an optical material on at least one surface of the polarizing film.

* * * * *